United States Patent
Poort et al.

(10) Patent No.: US 10,659,313 B2
(45) Date of Patent: May 19, 2020

(54) DYNAMIC OPTIMIZATION OF SIMULATION RESOURCES

(71) Applicant: Rescale, Inc., San Francisco, CA (US)

(72) Inventors: Gregorius E. Poort, San Francisco, CA (US); Mulyanto W. Poort, San Francisco, CA (US); Ryan A. Kaneshiro, San Francisco, CA (US); Adam C. McKenzie, San Francisco, CA (US)

(73) Assignee: RESCALE, INC., San Francisco, CA (US)

( * ) Notice: Subject to any disclaimer, the term of this patent is extended or adjusted under 35 U.S.C. 154(b) by 0 days.

(21) Appl. No.: 16/398,942

(22) Filed: Apr. 30, 2019

(65) Prior Publication Data

US 2019/0260648 A1    Aug. 22, 2019

Related U.S. Application Data

(63) Continuation of application No. 16/131,516, filed on Sep. 14, 2018, now Pat. No. 10,333,795, which is a (Continued)

(51) Int. Cl.
*G06F 15/173* (2006.01)
*G06F 15/16* (2006.01)
(Continued)

(52) U.S. Cl.
CPC .......... *H04L 41/147* (2013.01); *G06F 9/5066* (2013.01); *H04L 47/70* (2013.01); *H04L 67/10* (2013.01)

(58) Field of Classification Search
CPC ....... H04L 41/147; H04L 47/70; H04L 67/10; G06F 9/5066
(Continued)

(56) References Cited

U.S. PATENT DOCUMENTS 9,477,533 B2 * 10/2016 Eastep ................. G06F 9/5094
10,001,389 B1 * 6/2018 Das ....................... G01D 4/002
(Continued)

*Primary Examiner* — Melvin H Pollack
(74) *Attorney, Agent, or Firm* — Klintworth & Rozenblat IP LLP

(57) ABSTRACT

The present invention dynamically optimizes computing resources allocated to a simulation task while it is running. It satisfies application-imposed constraints and enables the simulation application performing the simulation task to resolve inter-instance (including inter-server) dependencies inherent in executing the simulation task in a parallel processing or other HPC environment. An intermediary server platform, between the user of the simulation task and the hardware providers on which the simulation task is executed, includes a cluster service that provisions computing resources on hardware provider platforms, an application service that configures the simulation application in accordance with application-imposed constraints, an application monitoring service that monitors execution of the simulation task for computing resource change indicators (including computing resource utilization and application-specific information extracted from output files generated by the simulation application) as well as restart files, and a computing resource evaluation engine that determines when a change in computing resources is warranted.

14 Claims, 7 Drawing Sheets

Related U.S. Application Data continuation of application No. 15/235,004, filed on Aug. 11, 2016, now Pat. No. 10,193,762.

(51) Int. Cl.
*H04L 12/24* (2006.01)
*G06F 9/50* (2006.01)
*H04L 12/911* (2013.01)
*H04L 29/08* (2006.01)

(58) Field of Classification Search
USPC .......................................................... 709/224
See application file for complete search history.

(56) References Cited

U.S. PATENT DOCUMENTS

| | | | | |
|---|---|---|---|---|
| 10,120,724 | B2* | 11/2018 | Badjatia | H04L 12/14 |
| 10,157,124 | B1* | 12/2018 | DeSimone | G06F 12/02 |
| 10,158,743 | B2* | 12/2018 | Deuri | H04L 67/1097 |
| 10,162,684 | B2* | 12/2018 | Feng | G06F 9/5061 |
| 10,303,576 | B1* | 5/2019 | Seymour | G06F 16/254 |
| 10,360,122 | B2* | 7/2019 | Morgan | G06F 9/45558 |
| 10,387,402 | B2* | 8/2019 | Stefani | G06F 16/2365 |
| 10,395,195 | B2* | 8/2019 | Kapasi | G06Q 10/06313 |
| 10,411,975 | B2* | 9/2019 | Martinez | H04L 41/5054 |
| 10,466,754 | B2* | 11/2019 | Eastep | G06F 1/26 |
| 10,467,036 | B2* | 11/2019 | Anwar | G06F 9/45558 |
| 10,469,390 | B2* | 11/2019 | Amulothu | H04L 47/125 |
| 10,491,537 | B2* | 11/2019 | Wang | H04L 47/72 |
| 10,516,623 | B2* | 12/2019 | Leafe | G06F 9/44526 |
| 2017/0060609 | A1* | 3/2017 | Cropper | G06F 9/5077 |
| 2018/0107390 | A1* | 4/2018 | Bae | G06F 9/5027 |
| 2018/0191867 | A1* | 7/2018 | Siebel | G06Q 10/06 |
| 2019/0163842 | A1* | 5/2019 | Pal | G06F 16/90335 |
| 2019/0258560 | A1* | 8/2019 | Weissinger | G06F 11/3409 |

* cited by examiner

DYNAMIC OPTIMIZATION OF SIMULATION RESOURCES

The present application is a continuation of co-pending U.S. Non-Provisional patent application Ser. No. 16/131,516, filed Sep. 14, 2018 which is a continuation of U.S. Non-Provisional patent application Ser. No. 15/235,004, filed Aug. 11, 2016, which is incorporated by reference herein. The present invention relates generally to managing computing resources in parallel processing environments, and in particular to dynamically optimizing computing resources during the execution of a task having inter-instance dependencies, such as a simulation or other high-performance computing task.

BACKGROUND

Field of Art

Description of Related Art

As the demand for hardware and software computing resources continues to increase at a dramatic pace, new computing platforms have evolved in part to alleviate the burden on individuals and companies of providing access to and management of computing resources in a cost effective manner. The "hardware providers" that operate such platforms enable customers to outsource their physical computing resource requirements while retaining a great deal of control over their use.

For example, cloud computing platforms from companies such as Amazon, Microsoft and Google offer customers access to shared physical computing resources. Such computing resources include servers with one or more operating systems, one or more single or multi-core CPUs, network interconnectivity hardware (e.g., Ethernet controllers) and varying amounts of memory (e.g., RAM and nonvolatile memory) and persistent storage (e.g., hard disks and flash drives), including external hard disk and flash arrays. Each hardware provider typically offers a variety of different server "types" with different configurations of computing resources for execution of applications on their platforms.

These hardware providers often employ virtualization to enable customers to specify a set of virtual computing resources (e.g., "virtual machines") to be allocated to each customer request. Certain hardware providers offer similar services, but enable customers to specify dedicated physical hardware that is not shared with other customers. Such "bare metal" services may provide enhanced performance for tasks that are particularly CPU-intensive, such as those found in simulations and other high-performance computing (HPC) environments.

Whether providing virtual and/or bare metal services, hardware providers frequently offer an on-demand "pay-per-use" model (in lieu of, or in addition to, a periodic monthly or annual lease or "subscription" model) in which customers pay only for the time during which they use specified computing resources. Efficient use of such resources is important both to hardware providers (to maximize value by efficiently deploying finite physical computing resources across a base of customers) and to their customers (to optimize value, for example, by balancing the cost-saving benefit of provisioning less powerful computing resources against the time-saving benefit of completing specified tasks more quickly).

Hardware providers face a "load balancing" problem in allocating usage of finite physical computing resources across the overlapping demands of multiple customers. Various "dynamic provisioning" approaches have been employed to reallocate the computing resources specified by each customer among different available physical servers and associated computing resources (memory, storage, network bandwidth, etc.)—see, e.g., U.S. Pat. No. 9,009,294. Such load-balancing approaches do not, however, adequately address the scenario in which the computing resource requirements of a task change dynamically—i.e., during the execution of the task. In such scenarios, it is not sufficient merely to reallocate a task's computing resources among different physical servers. Another mechanism is required to identify and address, at various points during the execution of a task, the problems posed by a suboptimal allocation of computing resources to that task.

While hardware providers can monitor a task's current usage of computing resources (e.g., utilization percentages of CPU, RAM, storage, network bandwidth, etc.), such "computing resource utilization" information alone is insufficient to determine the task's optimal "future" resource requirements. To make such a future prediction or forecast would require access to internal "application-specific" information relating to the application being executed and the particular functionality of the task being implemented.

One current approach to this problem is exemplified by Amazon's "EC2 Auto Scaling" service, which enables its customers to define the conditions that determine dynamically when to increase and/or decrease the number of "Amazon EC2 Instances" (i.e., virtual servers of a particular type) allocated to the current request. Not to be confused with multiple "instances" of an application running on distinct CPU cores in a parallel processing environment, Amazon EC2 Instances are virtual machines or virtual servers that have a specified configuration of computing resources (CPU cores, memory, storage, network bandwidth, etc.). When a customer-specified condition is satisfied, the number of EC2 Instances is increased or decreased by the customer-specified amount.

For example, consider a web server application that processes numerous HTTP requests from external client web browsers over time. Amazon's customer (e.g., the owner of a website) might initially request that Amazon provision four EC2 Instances, where each EC2 Instance is a virtual server with an 8-core CPU, 32 GB of RAM, 160 GB of storage and a 10 GB Ethernet connection. An instance of the web server application might be running on each of the 32 cores, and each core might handle hundreds or thousands of external HTTP requests from various web browsers every second.

As the number of external client web browser requests increases or decreases, the customer might desire to increase or decrease the number of EC2 Instances accordingly, thereby attempting to provision an "optimal" amount of computing resources over time. For example, the customer might specify an EC2 Auto Scaling condition that triggers the provisioning of eight additional EC2 Instances when the number of external HTTP requests per second across all current EC2 Instances exceeds a predefined threshold. Conversely, another condition might trigger the termination of existing EC2 instances when the number of HTTP requests falls below a lower predetermined threshold.

It should be noted that, when EC2 Instances are removed, the application instance running on each CPU core of those EC2 instances is terminated. Similarly, when EC2 Instances are added, a new application instance is installed and executed on each CPU core of each of those added EC2 Instances. Nevertheless, these changes can be said to occur "while the application is running" because they occur automatically, without intervention of the customer, and without completely "starting over" and forfeiting all of the task's current progress.

Because external HTTP requests are generally independent of one another, due to the stateless nature of the HTTP protocol, the task performed by a web server application benefits from parallel processing by simultaneously executing similar independent "sub-tasks" (e.g., external HTTP requests) on each of multiple CPU cores. Moreover, because future sub-task calculations are not generally dependent upon prior such calculations (also due to the stateless nature of the HTTP protocol), web server applications are also relatively immune from dynamic changes in computing resources (e.g., the addition or removal of EC2 Instances), making web server applications ideal candidates for Amazon's EC2 Auto Scaling service.

To the extent such dependencies exist, however, the customer must identify and address them. No such mechanism is provided by Amazon's EC2 Auto Scaling service, as it has no knowledge of the internal application-specific information relating to the application being executed and the particular functionality of the task being implemented.

For example, if a web server application handles multiple external HTTP requests within a webpage containing multiple related forms, certain subsequent sub-task calculations regarding these related forms might be dependent upon prior calculations (e.g., where the value of a field in one form depends upon the value of a field in another form). Thus, in the event of the termination of an EC2 Instance, the customer would be required to detect such dependencies and address them—e.g., by saving the results of relevant prior calculations for use by another EC2 instance performing the subsequent calculations dependent upon such results. Similarly, in the event of an added EC2 Instance, the customer would be required to ensure that subsequent calculations performed by newly added EC2 Instances know where to obtain the results of any prior calculations on which they are dependent.

While applications specifically designed for parallel processing may include mechanisms to address such dependencies, they typically must be pre-configured with the "knowledge" of at least a subset of the provisioned computing resources (e.g., the number of CPU cores), making it difficult to modify such computing resources while the application is running. Amazon's EC2 Auto Scaling service has no built-in mechanism for communication among EC2 Instances—e.g., to inform a running application that additional CPU cores are available, whether on the same or another EC2 Instance.

As a result, there are significant limitations to this EC2 Auto Scaling approach. One problem is that the customer must specify the conditions under which a change in computing resources is required, as well as the nature of the change (e.g., the number of EC2 Instances to be added or removed once a condition is satisfied). Moreover, to be effective, such conditions must be predictive, and not merely reactive. For example, the fact that external HTTP requests exceed a predefined threshold at any given time may or may not reflect a traffic pattern that will continue, even into the near future.

Even more significantly, the customer is left to address "inter-instance" (including "inter-server") dependencies in order to manage the consequences of these dynamic changes in computing resources. As noted above, many applications implement tasks that benefit from parallel processing due to the existence of independent sub-tasks that can perform intermediate calculations in parallel—typically by running multiple instances of the application simultaneously on distinct CPU cores. However, these applications often exhibit inter-instance dependencies in which subsequent calculations, performed by one instance of an application on one CPU core, are dependent upon the results of these intermediate calculations (on the same or other CPU core, or even across physical or virtual servers, resulting in inter-server dependencies).

The presence of these inter-instance dependencies imposes a significant burden on customers seeking to modify the computing resources allocated to a task while it is running. As noted above, even if the application is designed for parallel processing, and includes a mechanism to address these inter-instance dependencies, the customer is still left with the problem of informing a running application that particular computing resources have changed—e.g., that certain CPU cores have been added or removed. No such mechanism presently exists.

Simulation applications (as well as other HPC applications) are prime examples of applications that benefit from parallel processing environments because they typically involve many similar sub-task calculations that overlap in time but are not dependent upon one another and can thus be performed in parallel. Yet, because subsequent calculations during the course of a simulation are often dependent upon the results of these prior intermediate sub-task calculations (i.e., due to the existence of inter-instance dependencies), simulation applications must address these inter-instance dependencies in order to function properly in a parallel processing environment.

Simulation applications are designed to facilitate parallel processing of independent sub-tasks while also providing mechanisms for addressing inter-instance dependencies—e.g., by communicating the results of intermediate calculations among CPU cores and servers that perform the subsequent sub-tasks that are dependent on those prior results. Yet, in order to implement such communications, simulation applications impose certain constraints on the simulation task, such as assuming a minimum amount of RAM or network bandwidth, or being pre-configured with a specific number of CPU cores based upon the particular characteristics of a customer's simulation data "model."

In other words, simulation applications assume advance knowledge (through pre-configuration) of at least a subset of the computing resources on which they run, presenting a challenge for customers seeking to modify those computing resources while a simulation application is running. To better understand this challenge, it is helpful to understand how simulation applications address specific inter-instance dependencies and utilize computing resources within the boundaries of their own "application-imposed constraints."

Simulation applications implement underlying algorithms that utilize customer-provided data "models" designed to represent the behavior of a particular real-world or abstract system within a vast array of scientific and engineering disciplines. The system being modeled, including its environment, is typically divided into discrete components or "cells" (sometimes referred to as "elements," "particles," "molecules," etc., depending upon the simulation discipline). These component cells have certain properties (length, density, temperature, pressure, etc.) that undergo various changes over time. Even systems with no real-world or physical counterpart (e.g., role-playing applications) can be divided into component cells exhibiting various abstract properties (e.g., psychological behaviors, emotions, actions, etc.).

A car manufacturer designing a front bumper might employ simulation software to model the effects of their car crashing into a solid wall. The effect of the impact on the properties of individual cells of the front bumper which directly impact the wall might initially be calculated in parallel to the extent such calculations are independent of one another (e.g., by running the simulation application simultaneously on multiple CPU cores). However, the indirect effects of the impact on neighboring cells over time are dependent upon the results of these initial calculations, thus resulting in inter-instance dependencies (including inter-server dependencies).

Similarly, an airplane designer might simulate the effects of turbulence on an airplane wing by employing numerous individual cells not only to represent the wing itself, but also to represent the air surrounding the surface of the wing during flight. When a simulation application "runs" the model of the airplane in flight in its environment, it calculates these changes to the properties of the cells in accordance with the rules or constraints imposed by the model.

As the execution of a simulation progresses, the simulation application (also in accordance with the customer's model) may divide an individual cell into multiple cells (e.g., to process more detailed interactions among component cells), or conversely combine multiple cells together into a single cell. It should be noted that this modification of the number of cells impacts the efficiency of the simulation application's use of computing resources. For example, at any given point in time during the execution of a simulation, there may exist an ideal number of "cells per core"—based on a balance between the desire for maximum parallelism and the overhead imposed by inter-instance communication among CPU cores (as well as "global optimizations" for various other factors, such as time and cost). Changes in the number of cells at any given point in time may therefore render the actual specified computing resources more or less "optimal."

What is needed, particularly in parallel processing and other HPC environments, is a mechanism and process for dynamically optimizing the computing resources allocated to a particular task, while freeing customers from the responsibility of determining the conditions warranting changes in such computing resources, as well as the nature of such changes. Such a mechanism and process must also automatically adhere to application-imposed constraints that enable the application to address inter-server and other inter-instance dependencies affected by such changes.

SUMMARY

The present invention includes embodiments of systems and methods for addressing the deficiencies noted above, e.g., by providing an intermediary server platform that frees a customer from determining, for a specific task, optimal computing resources needed at various points in time during the execution of that task. While the present invention can be applied to various types of applications that benefit from parallel processing and other HPC environments, the embodiments discussed herein focus on the area of scientific and engineering simulation for illustrative purposes.

However, any application involving independent sub-tasks whose subsequent calculations have dependencies on the results of prior sub-task calculations can attain the benefits of the present invention. Moreover, while specific hardware and software embodiments are described below, the functionality of the various components of the present invention can be combined or divided into other distinct components, and implemented in hardware or software, without departing from the spirit of the present invention.

In one embodiment, a "simulation server platform" is provided as an intermediary (e.g., over the Internet, or other network connection) between end-user customers desiring to run simulations of their models and hardware providers of the physical computing resources on which particular simulation applications will execute user simulations. In this embodiment, the simulation server platform serves as the "customer" of one or more hardware providers, while the end user is the "customer" of the simulation server platform. The owner of each simulation application may license its application to the user directly, or indirectly via the owner of the simulation server platform (or even via the owner of a hardware provider platform).

For example, the end user establishes a connection over the Internet with the simulation server platform, specifies a desired simulation application, and provides its simulation data model and other relevant input parameters and data files. In one embodiment, the user also selects a desired initial set of computing resources, while in another embodiment, the simulation server platform makes this initial determination based upon an analysis of the information provided by the user.

In either event, the simulation server platform establishes a connection over the Internet with one or more hardware providers, and provisions an initial set of computing resources—i.e., a "cluster" of physical or virtual servers from among the available computing resource types offered by each hardware provider. The simulation server platform installs the appropriate simulation application on the provisioned cluster (e.g., including an instance of the simulation application on each CPU core), along with other relevant software and data, including the user's simulation model, and then initiates the execution of the simulation task. Note that simulations may execute for hours, days or even weeks, while simulating a much shorter period of time in the real-world or abstract "system" being modeled or simulated (e.g., a 15-second car crash may take 3 weeks to simulate).

As will be discussed in greater detail below, the simulation server platform also performs, in one embodiment, a "metering" function, whereby it monitors the time during which the simulation is executing on particular provisioned hardware as well as software computing resources. This enables the owner of the simulation server platform to offer user pricing models that vary from those established by hardware providers and vendors of simulation applications (and charged to the owner of the simulation server platform).

For example, with respect to hardware metering, a simulation that runs for three hours would enable a pricing calculation based upon the cost of each particular provisioned hardware resource. For example, a 16-core server with 8 GB of RAM (and a "price per core hour" of $0.10 for CPU cores and $0.05 for 8 GB of RAM) would yield a price of $7.00 for a three-hour simulation (48 core hours for a CPU price of $4.80 and a RAM price of $2.40), taking into account only CPU cores and RAM. While hardware providers typically offer pricing for a particular virtual server type, the use of an intermediary simulation server platform enables a wide variation of customer pricing models that may or may not mimic those offered by a selected hardware provider—e.g., on-demand or low priority pricing, as well as different "core-hour" or other pricing for individual computing resources (e.g., RAM, network bandwidth, etc.), as opposed to pricing on a physical or virtual server basis.

Moreover, given that the present invention enables modification of the specified computing resources allocated to a simulation task, the hardware metering functionality of the present invention monitors the time (and associated pricing) allocated to each set of computing resources provisioned during the execution of the simulation task.

Similarly, with respect to software metering, the simulation server platform monitors the time during which a particular simulation application (and, in one embodiment, each component thereof) is executed. While some simulation application vendors employ a metered software pricing model, others may utilize a subscription, per-seat, concurrent user, or other pricing model. In any event, the software metering functionality of the present invention facilitates flexibility in offering various different pricing models to different users or groups of users.

Moreover, in one embodiment, when different sets of computing resources are provisioned over time to a simulation task, different software pricing models are employed. The software metering functionality of the present invention enables monitoring of the time allocated to different simulation applications (and to particular components thereof) running during the course of the execution of a single simulation task.

The simulation server platform also serves as an intermediary for the authentication of users with respect to particular simulation applications and component features. In one embodiment, the simulation server platform communicates with software "license servers" that can be deployed in various different physical locations, including for example the premises of the user, the simulation application provider, one or more hardware providers, or even directly on the simulation server platform (which itself may be deployed on a hardware provider's physical hardware).

To facilitate the dynamic modification of the computing resources allocated to an individual simulation task, the simulation server platform, in one embodiment, includes a "cluster service" that provisions a cluster of computing resources on a hardware provider platform for executing a user's simulation task (i.e., a simulation application that runs a user's simulation data model). In one embodiment, the cluster includes one or more virtual servers of a selected type of virtual server offered by a hardware provider, having a particular configuration of CPU cores, RAM, storage, network bandwidth, etc.

As noted above, the simulation application is designed to run on the cluster in a parallel processing environment, in which individual instances of the simulation application run in parallel on distinct CPU cores, and perform independent sub-task calculations simultaneously. Moreover, the simulation application addresses inter-instance (including inter-server) dependencies, in which subsequent sub-task calculations performed by one instance of the simulation application are dependent upon the results of prior sub-task calculations performed by the same or other instances (i.e., across CPU cores and, in some cases, across virtual servers).

The simulation server platform also includes, in one embodiment, a "simulation service" that configures the simulation application with various user-specified input parameters, the user's simulation model, the required subset of specified computing resources (e.g., the number of CPU cores) and other relevant software, input parameters and data files. As noted above, the computing resources specified in the cluster must adhere to any constraints imposed by the simulation application (e.g., a minimum amount of RAM), even if not required to be specified.

In this embodiment, the simulation service installs all relevant software and data in the cluster, including instances of the simulation application on each CPU core, as well as other software unique to other components of the present invention described in greater detail below. Finally, the simulation service initiates execution of each instance of the simulation application on each CPU core within each virtual server in the cluster.

The simulation server platform further includes a simulation monitoring service that, in one embodiment, dynamically monitors over time various "resource change indicators" that relate to the simulation application's use of the computing resources in the cluster, and provide information that is utilized by the present invention on a continuous basis to determine whether and when a change is warranted in the current computing resources allocated to the simulation application, as well as the nature of that change (e.g., a different type of virtual server with a sufficient number of additional CPU cores).

As will be described in greater detail below, such resource change indicators include, in one embodiment, both "computing resource utilization" information (such as the percentage of current utilization of particular computing resources by instances of the simulation application) and "application-specific" information (relating to the particular simulation application task being monitored) that reflect the extent to which the simulation application's use of the current computing resources in the cluster meets certain predefined goals, and facilitate predictions of the simulation application's future computing resource requirements.

In addition, in one embodiment, the simulation monitoring service monitors and stores computing resource utilization and application-specific information over time with respect to each computing resource, so that historical trends can be discerned, as will be discussed in greater detail below. For example, at a given point in time, the simulation monitoring service monitors a simulation task's utilization of CPU, RAM, storage and network bandwidth resources within the specified cluster. A CPU core on a particular virtual server may exhibit a current 58% CPU utilization, while 78% of the available RAM may be in use.

Such current and historical information, taken individually, may suggest a need for an increase or decrease in a particular specified computing resource (e.g., based upon predefined thresholds). In another embodiment, a more holistic (and even predictive) analysis is facilitated by a rules-based or machine learning engine that considers both computing resource utilization and application-specific information as a whole.

The resource change indicators also include application-specific information relating to the particular simulation application task being monitored. For example, as a simulation progresses, the simulation application writes various data to "output files" that are parsed by the simulation monitoring service to extract information from which it can infer whether a change in computing resources is warranted.

It should be noted that simulation applications write data to output files for an entirely different purpose than is employed by the present invention. Such information is intended for manual analysis by users (perhaps with the assistance of analytic tools) for a variety of different reasons. For example, a user may troubleshoot a simulation and determine from the information in the output files whether an error has occurred that warrants stopping the simulation, and perhaps re-running it at a future time once the problem has been resolved—e.g., correcting a bug in the simulation model. In another scenario, a user may analyze this information to assess the efficiency of the simulation, and perhaps make changes to the model or to input data so that future simulations will execute in a shorter amount of elapsed time, utilize fewer computing resources, or otherwise meet whatever desired constraints the user desires.

In any event, in one embodiment, the simulation monitoring service parses the output files for information providing valuable insights with respect to the efficiency of the simulation application's use of current computing resources, as well as its potential future computing resource requirements (including predictions of future computing resource utilization). It should be emphasized that the present invention challenges the "conventional wisdom" that a single fixed set of computing resources is optimal throughout the execution of an entire simulation task. Various different types of information are extracted from output files to facilitate this analysis and determination of when a change in computing resources is warranted, as well as the nature and degree of such change.

For example, as noted above, simulation applications may from time to time divide cells into multiple cells, or combines multiple cells into a single cell, thereby altering a specified cells-per-core ratio and perhaps suggesting a need for more or fewer CPU cores—or at least factoring into a future prediction of the number of cells or other related factors. Other information found in or inferred from the output files relates to disk I/O operations. For example, an increase in disk I/O operations over time might suggest an imbalance in inter-instance or inter-server communications, possibly suggesting a need for more RAM per CPU core if such increases are predicted to continue at a particular rate. In other scenarios, the results of particular calculations might suggest, for example, that a resource-intensive phase of the simulation (e.g., a combustion cycle) has begun.

As also noted above, the simulation application itself imposes certain computing resource constraints, which also must be taken into account before modifying the computing resources allocated to the simulation application. These "application-imposed constraints" require that the simulation application be pre-configured (e.g., via input parameters or configuration files) with certain of the computing resource information. For example, a simulation application typically must "know" the particular number of CPU cores on which instances of the application are installed in order to function correctly and address the relevant inter-instance dependencies—e.g., by handling communications among the CPU cores. Without that knowledge of certain computing resource specifications, the simulation application could not address the dependencies that occur when subsequent independent sub-task calculations performed by a CPU core require results from prior calculations performed by other CPU cores, perhaps on other physical or virtual servers.

It is therefore vital that the simulation application be pre-configured with the necessary computing resource specifications before execution begins. If simulation applications could be reconfigured during execution, a change in computing resources could be effected dynamically without ever halting execution of the simulation task. However, given current limitations in simulation software design, the present invention, in one embodiment, temporarily suspends execution of the simulation applications in the current cluster when a change in computing resources is warranted, and restarts instances of the simulation task on a new cluster. Yet, such a process requires knowledge of a current intermediate "simulation state" (i.e., the precise state of all variables).

So, in addition to monitoring resource change indicators, the simulation service also, in one embodiment, monitors the writing of "restart files" generated by the simulation application and containing a current intermediate simulation state. In many cases, the frequency with which simulation applications write these restart files to disk can be configured before the simulation application is executed; though it should be noted that it may be prohibitive to save the entire simulation state too frequently (e.g., due to the time and other resources required to save the entire simulation state).

As was the case with the output files, these restart files are intended for a different purpose (fault tolerance) from the one utilized by the present invention. This process, sometimes referred to as "checkpointing," involves the periodic writing to disk of an application's state, so that the application can resume from this intermediate state in the event of a failure (e.g., a hardware failure, software crash, etc.).

The simulation server platform, however, utilizes these restart files, in one embodiment, not for the purpose of recovering from hardware or software failures, but for the purpose of facilitating a change in computing resources while the application is running (even though the change itself involves suspending and resuming execution of instances of the simulation application). In other words, in this embodiment, the simulation server platform intentionally terminates a simulation running on a hardware provider's currently provisioned cluster, and provisions a new cluster (from the same or a different hardware provider, or multiple hardware providers) with different computing resources, where it can be restarted from the saved intermediate simulation state contained in a selected restart file.

Unlike a fault tolerance or failure scenario, the simulation server platform knows in advance (based on real-time monitoring) whether an appropriate restart file exists, and precisely when to suspend execution of the simulation task. Moreover, in one embodiment, based upon predicted computing resource usage, the simulation server platform determines an optimal time to effect this change, as well as generate an optimal new set of computing resources that complies with the constraints imposed by the various types of computing resources available on one or more hardware provider platforms, as well as the constraints imposed by the simulation application itself (which is reconfigured to conform to the new set of computing resources).

The simulation server platform additionally includes, in one embodiment, a computing resource evaluation module that continuously analyzes the computing resource change indicators and existing restart files to determine when a change in computing resources is warranted. It should be noted that an otherwise warranted change may be affected by the lack of a sufficiently recent restart file. In another embodiment, users can configure certain simulation applications to control the frequency with which such applications generate restart files.

As will be discussed in greater detail below, the computing resource evaluation module applies various techniques (including predefined formulas and triggers, rules-based analytics and machine-learning) designed to predict the application's future computing resource requirements. In one embodiment, this monitored information is continuously analyzed to determine whether one or more predefined threshold conditions have been satisfied so as to warrant a change in computing resources. It should be emphasized that this analysis process is performed automatically in real time without any need for user intervention.

In the event a change in the current set of provisioned computing resources is warranted, the simulation server platform further includes, in one embodiment, a computing resource calculation module that applies similar techniques to those performed by the computing resource evaluation module, but with consideration of the additional constraints imposed by the types of computing resources available on one or more hardware provider platforms. For example, upon determining that a change is warranted, the computing resource calculation module may determine that an additional 16 CPU cores is optimally required, but that 32 GB less RAM is needed, potentially resulting in the selection of a different type of virtual server offered by one or more hardware providers (perhaps even a different hardware provider than the one on which the simulation application is currently executing).

Once the computing resource calculation module generates the specifications of the desired new cluster of modified computing resources, the current cluster must be replaced. The simulation server platform includes, in one embodiment, a simulation resource manager that directs the cluster service to provision the new cluster of modified computing resources on a selected hardware provider platform, and to terminate the current cluster on which the simulation application is currently executing (after saving relevant data that may be required by the new cluster).

It then directs the simulation service to reconfigure the simulation application with a specification of the required subset of the modified computing resources, as well as the location of the selected restart file containing the intermediate simulation state from which the simulation application can resume execution.

The simulation service then installs all relevant software and data in the new cluster, including instances of the simulation application on each CPU core, as well as other software unique to other components of the present invention described in greater detail below. Finally, the simulation service initiates execution (i.e., "resumes" execution from the saved intermediate simulation state) of each instance of the simulation application on each CPU core within each virtual server in the new cluster.

In one embodiment, users specify one or more predefined global optimization goals, such as optimizing for the shortest overall execution time, least expensive computing resource fees or various other goals, including an optimization function balancing one or more of such goals. In this embodiment, the simulation server platform accommodates such goals in its determination of when and to what extent to modify current computing resources, in order to optimize for the user's specified goals. In particular, the simulation server platform monitors both resource change indicators and application-specific information, and assesses the extent to which the simulation application's use of the current computing resources meets such predefined goals.

In an alternative embodiment, the simulation server platform predetermines a number of "simulation stages" and associated sets of computing resources (e.g., based upon user-provided information from prior simulations), as opposed to determining such stages dynamically in real time. In this embodiment, the simulation server platform need only determine when to effect a transition from one predefined simulation stage to another.

In another alternative embodiment of the present invention, the simulation server platform provides recommendations of computing resources to users (rather than effecting automatic changes in computing resources) based, for example, on an analysis of prior simulation tasks and other user-provided information. In another alternative embodiment, the simulation server platform "pre-runs" a portion of the simulation application (e.g., one pass through a major loop or time period) for the purpose of predicting computing resource requirements for a future "complete" run of the simulation task.

Before turning to a detailed description of the embodiments of the present invention illustrated in the following drawings, it should be noted that the present invention provides significant benefits to users who currently must select a single fixed set of computing resources on which their simulation task will be executed. For example, users who "overspecify" a cluster of computing resources ultimately overpay for their simulation tasks, while users who "underspecify" a cluster of computing resources may find that their simulation tasks run too slowly, or perhaps fail entirely.

DETAILED DESCRIPTION

Detailed embodiments of the systems and methods of the present invention are illustrated in the accompanying Figures and described below. It should be noted at the outset that the present invention is not limited to the particular embodiments discussed below with reference to the Figures. For example, the present invention could be integrated into distinct server platforms with the functionality reallocated among fewer or more different conceptual modules (implemented in hardware or software), reflecting different engineering tradeoffs, without departing from the spirit of the present invention. Additional embodiments of the systems and methods of the present invention will be apparent to those skilled in the art.

Figure 1:
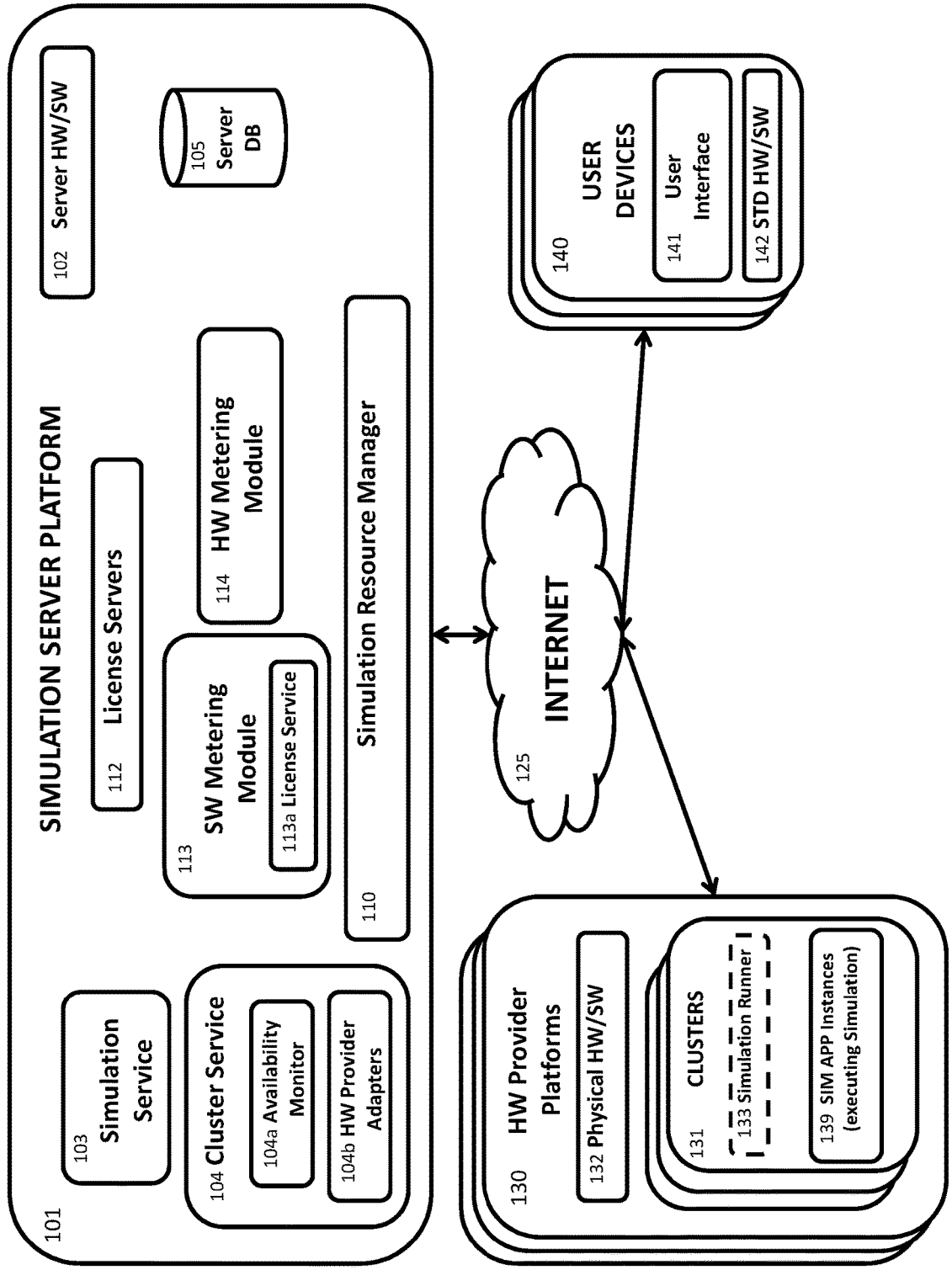
FIG. 1 is an architectural block diagram of one embodiment of the key components of the simulation server platform of the present invention.

Turning to FIG. 1, system 100 of the present invention enables users, via their User Devices 140 (desktop and laptop computers, smartphones, etc.), to run their simulations on the physical hardware of various Hardware Provider Platforms 130. Simulation Server Platform 101 serves as an intermediary (via the Internet 125) between the User Devices 140 and the Hardware Provider Platforms 130, providing users with a variety of features designed to enhance and simplify the simulation process.

For example, users need not identify and contract with multiple different hardware providers, install and configure their desired simulation applications and manage the associated license server deployment and authentication process. Instead, users are provided with a user-friendly interface tailored to running simulations, along with automated metering of their hardware and software usage and an integrated and flexible billing system.

Even more significantly, as will be explained in greater detail below, users are no longer limited to a single fixed set of computing resources. Instead, Simulation Server Platform 101 dynamically determines, while a user's simulation task is running, an "optimal" point at which a change in computing resources is warranted, as well as an "optimal" new set of computing resources. Moreover, Simulation Server 101 automatically implements that change in computing resources across one or more Hardware Provider Platforms 130, while preserving the ability of the selected simulation application to address inter-instance (including inter-server) dependencies without user intervention.

In one embodiment, users employ STD HW/SW 142 (including standard CPUs, displays, I/O devices, memory, etc.) to communicate with Simulation Server Platform 101 via the Internet 125. Instead of requiring custom client applications in this embodiment, standard web browsers are employed to provide the User Interface 141 through which users communicate with Simulation Server Platform 101. Thus, the functionality performed by each User Device 140 is implemented by standard CPUs executing instructions stored in memory. In other embodiments, custom hardware and software can be employed without departing from the spirit of the present invention.

Similarly, Hardware Provider Platforms 130 include Physical HW/SW 132 which implements its functionality via CPUs executing instructions stored in memory. As noted above, hardware providers frequently also include various virtualization hardware and software mechanisms designed to share Physical HW/SW 132 among multiple user applications running simultaneously, as is well known in the art. Simulation Server Platform 101 also includes Server HW/SW 102 to implement its functionality via CPUs executing instructions stored in memory. In one embodiment, much of the functionality of Simulation Server Platform 101 resides on one or more of the Hardware Provider Platforms 130, freeing the owner/operator of Simulation Server Platform 101 from providing its own standard physical hardware and software components to service its users. Some standard components of Server HW/SW 102 still reside on the premises of the owner/operator of Simulation Server Platform 101 to enable remote administrative access to the functionality of Simulation Server Platform 101.

When a user initiates a simulation task, Simulation Server Platform 101 deploys Clusters 131 on one or more Hardware Provider Platforms 130 to implement the user's simulation task. While various key components of each Cluster 131 will be discussed in greater detail below (in particular with reference to FIG. 5), it should be noted that, for each simulation task initiated by a user, certain components of Simulation Server Platform 101 are copied to and deployed on a Cluster 131 of one or more Hardware Provider Platforms 130 to manage the simulation process for that task. At a summary level, Simulation Runner 133 manages the operation of a user's simulation task, which is implemented by the Simulation Application instances 139 themselves—i.e., the instances of the simulation application selected by the user that typically run in parallel across multiple CPU cores.

Turning to the key components of Simulation Server Platform 101, Server DB (database) 105 is employed to store a variety of different types of current and historical data, including administrative billing, profile and other data regarding users, hardware providers and simulation application providers, as well as data relating to specific components of Simulation Server Platform 101 (discussed in greater detail below with respect to the operation of each component). The information stored in Server DB 105 should be distinguished, however, from information stored on the Cluster 131 provisioned for each user's simulation task, also discussed in greater detail below. In other embodiments, the storage requirements of Server DB 105 can be met by multiple distinct databases, as well as other short-term and long-term file storage mechanisms and physical devices, without departing from the spirit of the present invention. For example, in one embodiment, user data and other information relating to simulation tasks are encrypted and segregated in secure storage devices, and protected by various standard hardware and software security protocols.

Simulation Server Platform 101 authenticates users, as part of a standard authentication process, when they first access the system. However, before a user can initiate a simulation task, the user must first be authenticated for use of the particular simulation application selected by the user to simulate the behavior represented by the user's model. In another embodiment, certain simulation applications also require that users be authenticated for use of individual components of the simulation application. Such authentication may occur before the simulation task is initiated, or in other embodiments during the execution of the simulation—e.g., at the time the individual component is accessed.

This authentication process is implemented via License Servers 112 that are provided by owners of the individual simulation applications, as well as by third-party license server vendors. License Servers 112 may consist of software running on standard server hardware, or may be embodied in custom server hardware devices. Moreover, License Servers 112 may be deployed on the premises of the user, the simulation application provider, or in other locations (including the premises of Simulation Server Platform 101). In any event, the authentication process, as well as overall communication with License Servers 112, is managed by License Service 113a, as part of the software metering process performed by Software Metering Module 113.

As will be explained in greater detail below with reference to FIG. 4, Software Metering Module 113 monitors the total time a simulation application (or component thereof) is in use during the execution of a user's simulation task. Similarly, Hardware Metering Module 114 (discussed in greater detail below with respect to FIG. 3) monitors the total time the hardware computing resources are in use during the execution of a user's simulation task. It should be noted that, in the event multiple different sets of computing resources are deployed during the execution of a user's simulation task, Hardware Metering Module 114 will monitor the total time during which each set of computing resources is in use. In another embodiment, Hardware Metering Module 114 monitors the use of computing resources for an individual user's task across multiple Hardware Provider Platforms 130 (and in yet another embodiment individual hardware resources are monitored separately).

Together, Software Metering Module 113 and Hardware Metering Module 114 facilitate a flexible "pay per use" billing model that enables a user to optimize the cost, time and other desired characteristics of the user's individual simulation task, whether that simulation task involves one or more simulation applications, one or more hardware provider platforms, and one or more different sets of computing resources (as will be discussed in greater detail below).

Once a user initiates a simulation task, Cluster Service 104 provisions a cluster of computing resources from one or more of the available Hardware Provider Platforms 130. In one embodiment, the user determines the initial set of computing resources, selected from among various available choices provided by Simulation Server Platform 101. In another embodiment, Simulation Server Platform 101 determines this initial set of computing resources, employing the techniques described below to determine subsequent sets of computing resources while a user's simulation task is running.

Availability Monitor 104*a* maintains information regarding the availability of the various virtual server types provided by the Hardware Provider Platforms 130, including currently available capacity and associated pricing. At any given time, each user's simulation task will be associated with a cluster of virtual servers provisioned from one or more Hardware Provider Platforms 130. But, the various types of virtual servers (and capacity of each type, as well as pricing) offered by each of the Hardware Provider Platforms 130 may vary over time.

As noted above, from the perspective of a hardware provider, Simulation Server Platform 101 is the customer that provisions a cluster of one or more virtual servers associated with an individual user's simulation task. Yet, from the perspective of Simulation Server Platform 101, each user is a customer whose simulation task has varying computing resource requirements (which may or may not initially be categorized as a cluster of virtual servers). As will be explained in greater detail below, these computing resource requirements (whether established initially before a simulation task is initiated, or subsequently at various different points in time while the simulation task is running) are effectively "translated" into a cluster of virtual servers (of one or more particular virtual server types) currently made available by one or more Hardware Provider Platforms 130.

In any event, the connection between Simulation Server Platform 101 and each of the Hardware Provider Platforms 130 is maintained over the Internet 125 via Hardware Provider Adapters 104*b*—i.e., custom APIs enabling bidirectional communication and exchange of information. For example, Hardware Provider Adapters 104*b* are employed by Simulation Server Platform 101 to provision (as well as terminate) clusters of virtual servers from the Hardware Provider Platforms 130, as well as to obtain status information regarding a user's simulation task. As will be explained in greater detail below, this status information is employed not only for metering purposes (e.g., for use by Hardware Metering Module 114 and Software Metering Module 113) but also for monitoring data relating to the execution of each user's simulation task—e.g., computing resource utilization and application-specific information monitored over time with respect to each computing resource.

Once Cluster Service 104 provisions a cluster for execution of a user's simulation task, Simulation Service 103 configures the user's selected simulation application (or, in another embodiment, multiple different simulation applications) with various user-specified input parameters, along with the user's simulation data model and the required subset of specified computing resources. As noted above, these specified computing resources and other application-imposed constraints are required by simulation applications in order to simulate the user's model properly and address any inter-instance (and inter-server) dependencies.

Simulation Service 103 also installs all relevant software and data in the provisioned cluster. For example, in addition to configuring the simulation application on each virtual server in the cluster, an instance of that simulation application must be installed for execution by each CPU core on each such virtual server. Additional software and data components installed on each cluster will be discussed in greater detail below with reference to FIG. 5. Once all relevant software and data has been configured and installed, Simulation Service 103 initiates execution of each instance of the simulation application on each CPU core within each virtual server in the cluster.

Finally, Simulation Resource Manager 110 is responsible, in one embodiment, for managing the dynamic process of modifying the computing resources allocated to a user's simulation task while it is running. As will discussed in greater detail below with reference to FIGS. 6 and 7, Simulation Resource Manager 110 continually monitors execution of each user's simulation task as it is running in its provisioned cluster, searching for various "resource change indicators" that evidence a need to modify the current computing resources associated with that provisioned cluster. These resource change indicators include "computing resource utilization" information (such as the percentage utilization of each CPU core and other computing resources, such as RAM, storage, network bandwidth, etc.), as well as application-specific information relating to the user's simulation task (e.g., current number of cells in the user's model, extracted from output files written dynamically by the simulation application).

Upon extracting these resource change indicators, along with occasional restart files generated by the simulation application, Simulation Resource Manager 110 continually analyzes this information in order to determine an optimal point (if any) at which a change in computing resources is warranted. If such a change is warranted, Simulation Resource Manager 110 also determines an optimal new set of computing resources (e.g., 16 additional CPU cores, 8 GB less RAM, etc.), which it then "translates" into an available cluster of virtual servers on one or more Hardware Provider Platforms 130 (which may, in some cases, be on a different Hardware Provider Platform 130 than was employed for the current cluster—e.g., due to the lack of an appropriate virtual server type at that time).

As will be explained in greater detail below, this analysis can range from relatively simple calculations of predefined conditions and thresholds to a more complex rules-based analysis, and, in one embodiment, a predictive machine-learning approach involving an assessment of future computing resource requirements. In any event, once such an analysis triggers a change in computing resources, Simulation Resource Manager 110 invokes Cluster Service 104 to provision a new cluster, terminate the current cluster, and "resume" execution of the user's simulation task on the new cluster.

As noted above, in order to ensure that the simulation application can resume execution (e.g., from the intermediate simulation state contained in the selected restart file), Simulation Resource Manager 110 configures the simulation application in the new cluster with the required application-imposed constraints (e.g., the number of CPU cores in the new cluster) before initiating (resuming) execution.

The components of Simulation Server Platform 101 are themselves installed, in one embodiment, on a distinct cluster of one or more of the Hardware Provider Platforms 130, from which they are accessed for administrative and related purposes from any computer via a web browser interface and appropriate authentication credentials. Nevertheless, certain components of Simulation Server Platform 101 (e.g., Simulation Runner 133) are installed in each cluster corresponding 131 corresponding to a user's simulation task, as discussed in greater detail below.

Figure 2:
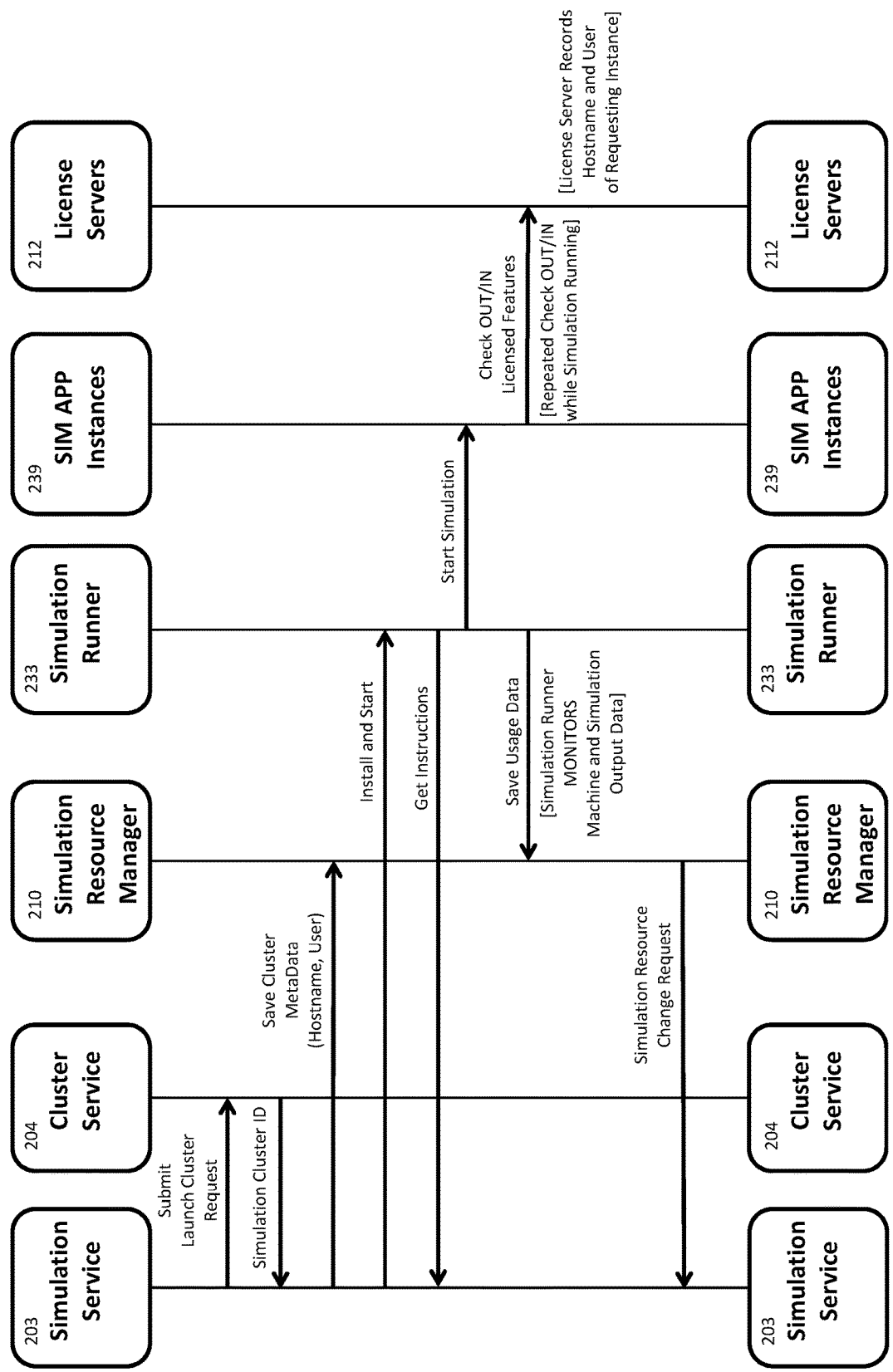
FIG. 2 is an architectural diagram illustrating one embodiment of the dynamic interaction of the key components of the simulation server platform of the present invention.

Turning to FIG. 2, diagram 200 illustrates one embodiment of the dynamic interaction of the key components of Simulation Server Platform 101 discussed above. For example, when a user initiates a simulation task, Simulation Service 203 invokes Cluster Service 204 with a "Launch Cluster" request (including the specifications of the computing resources defining the cluster), causing Cluster Service 204 to provision the cluster on one or more Hardware Provider Platforms 130 and to obtain a "Simulation Cluster ID," which it provides to Simulation Service 203. This Simulation Cluster ID facilitates future communications with Hardware Provider Platforms 130 via Cluster Service 204, as it uniquely identifies each specific cluster, associated with a particular user's simulation task. Such communications include terminating the cluster, as well as obtaining status information while the user's simulation task is running.

Simulation Service 203 generates Cluster Metadata (in one embodiment, a Hostname/User pair) relating to each particular cluster, which it provides to Simulation Resource Manager 210 to facilitate communications relating to that cluster. For example, when Simulation Resource Manager 210 determines that a change in computing resources is warranted with respect to a user's simulation task, it provides a "Simulation Resource Change Request" to Simulation Service 203, along with the relevant information regarding the new cluster (e.g., identifying the desired hardware provider, the number of virtual servers of a particular type, etc.). Cluster Metadata is also utilized in this embodiment for hardware and software metering (again to uniquely identify the user's simulation task).

Once a cluster is provisioned by Cluster Service 204, Simulation Service 203 installs and configures the relevant software and data on the cluster, including Simulation Runner 233, with which it then communicates to initiate execution of the user's simulation task, and to exchange status information while that task is running as well as perform certain "instructions" (e.g., uploading output files). Installation and configuration information provided by Simulation Service 203 includes the user's model, input configuration parameters and files for starting the simulation application (including application-imposed constraints relating, for example, to certain provisioned computing resources) and any other relevant input data (e.g., intermediate simulation state information from a selected restart file if the simulation is "resuming" execution rather than starting in its initial state).

Once Simulation Service 203 installs the relevant software and data and instructs Simulation Runner 233 to initiate execution of the simulation, Simulation Runner 233 starts the simulation by initiating execution of each of the "SIM APP Instances" 239 (i.e., each instance of the simulation application to be executed by a distinct CPU core), as is described in greater detail below. Simulation Service 203 also maintains periodic communication with Simulation Runner 233, for example, to "ping" the cluster to ensure it is still "alive" and to shut down the cluster when the simulation has completed (or an earlier termination is warranted, for example, due to a software or hardware failure). Many simulation applications implement a standard "Message Passing Interface" (MPI) that facilitates inter-node communication. In one embodiment, Simulation Runner 233 also implements MPI for its own communications.

In one embodiment, upon initiating execution of the simulation task, each of the SIM APP instances 239 of the simulation application communicates with License Servers 212 to authenticate the user and permit the user to "check out" and "check in" the simulation application, or specific component features of the simulation application. License Servers 212 employ the Hostname/User pair (generated by Simulation Service 203 as noted above) to uniquely identify the user whose simulation task is running to facilitate the authentication process. In another embodiment, a "master" instance in a "head node" within the cluster (discussed below with reference to FIG. 5) performs the authentication function on behalf of other nodes.

As the simulation task is running, Simulation Runner 233 obtains various types of usage data (including the extracted resource change indicators), and provides that data to Simulation Resource Manager 210 for analysis, as will be discussed in greater detail below. In addition, Simulation Server Platform 101 continuously meters the use by each simulation task of both hardware and software computing resources, as illustrated in FIG. 3 below.

Figure 3:
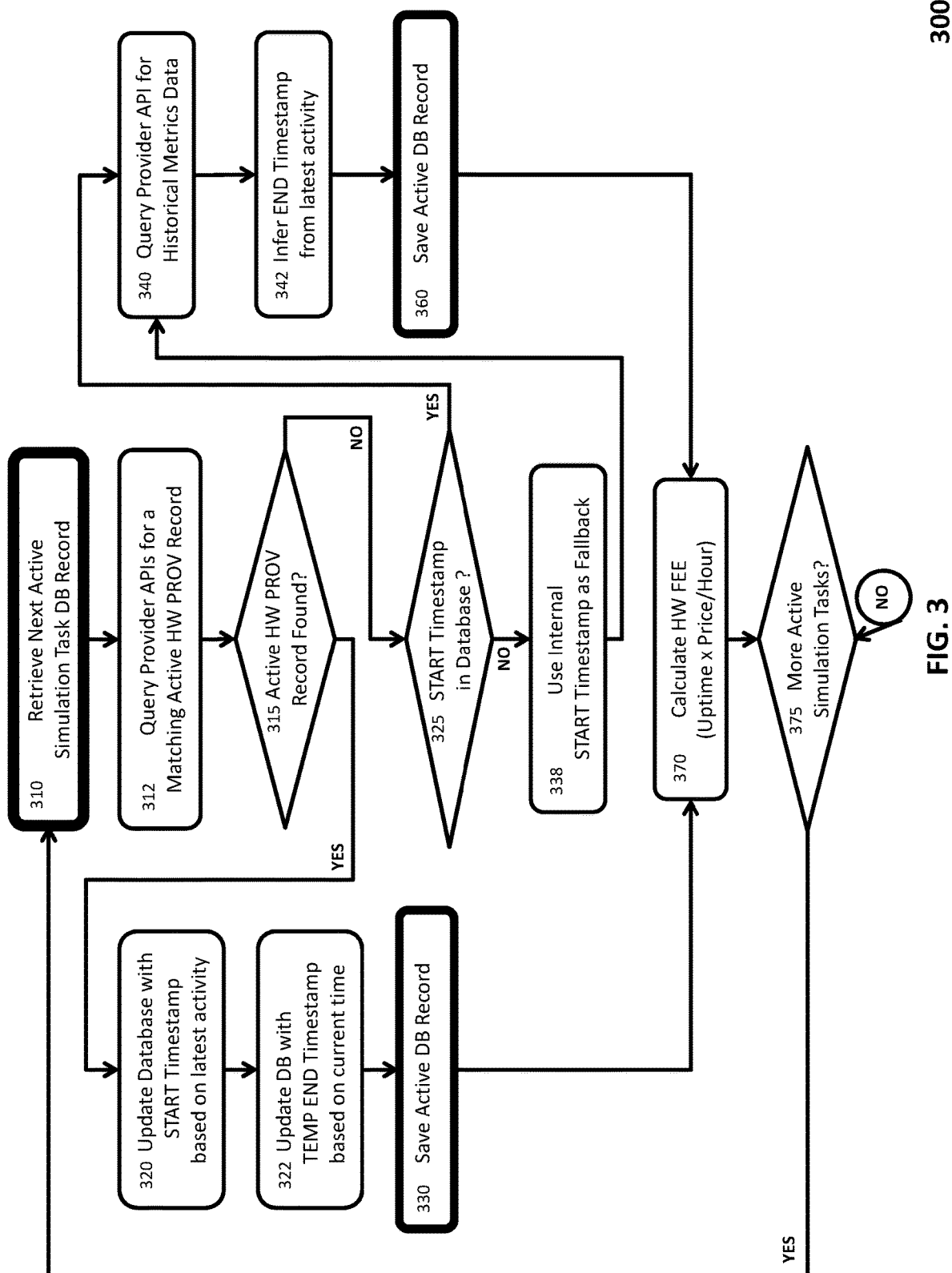
FIG. 3 is a flowchart illustrating one embodiment of a process performed by the hardware metering module on the simulation server platform of the present invention.

Flowchart 300 in FIG. 3 illustrates one embodiment of a metering process performed by Hardware Metering Module 114 to monitor the time during which the hardware resources of a provisioned cluster associated with a user's simulation task are in use (e.g., based upon a "START" and "END" time). This process enables the user to be billed on a "pay per use" basis by multiplying the pricing for specific hardware resources by the monitored usage time.

It should be noted that hardware providers typically operate on the level of granularity of a "virtual server" (or "virtual machine") as opposed to a cluster of multiple virtual servers. In other words, from the perspective of Simulation Server Platform 101, a user's simulation task is associated with a single cluster that may include multiple virtual servers (even across multiple hardware providers in one embodiment). Yet, from the perspective of a hardware provider, each virtual server may be considered a separate "billable job," as the hardware provider need not be aware that multiple virtual servers are associated with a single simulation task. Moreover, in another embodiment, a simulation task may be running simultaneously across different hardware providers, including providers of bare metal as well as virtual servers.

It should also be noted that, in addition to handling multiple users running various simulation tasks simultaneously (potentially across multiple different Hardware Provider Platforms 130), the process described in flowchart 300 also addresses the scenario (described in greater detail below) in which the hardware resources allocated to a user's individual simulation task are modified while the simulation task is running (e.g., to provision more or fewer hardware resources as required at various points during the execution of the simulation task). In such a scenario, the execution of a simulation task on a first cluster is stopped and resumed on a second cluster (perhaps multiple times); and the use of hardware resources on each of these clusters (and on each virtual server within each cluster) is metered at the differing prices associated with each cluster (or individual virtual server), thereby charging the user of the simulation task for an "optimal" amount of hardware resources.

In any event, it should be emphasized that the following discussion of the hardware metering process illustrated in flowchart 300 applies equally whether a hardware provider monitors the usage of hardware resources at the level of granularity of an individual simulation task and its associated cluster of hardware resources (including one or more virtual machines and/or bare metal servers), or at the level of granularity of each individual virtual or bare metal server (with distinct START and END times), unaware that the simulation task is associated with and running on multiple such servers (consecutively or simultaneously). One skilled in the art can easily extrapolate from flowchart 300 to understand how one combines separate START and END times across multiple virtual or bare metal servers (or even across multiple hardware providers) to generate a total hardware fee for a simulation task (even when different pricing exists for individual virtual or bare metal servers).

The continuous metering process illustrated in flowchart 300 begins at step 310 in which Hardware Metering Module 114 retrieves the next "active" simulation task record from Server DB 105. Though not all details are shown in flowchart 300, it is helpful to understand how database records relating to a simulation task are generated and maintained, both by Hardware Provider Platforms 130 and by Simulation Server Platform 101.

When Simulation Server Platform 101 provisions a cluster (associated with an individual simulation task) from a Hardware Provider Platform 130, the Hardware Provider Platform 130 maintains a "hardware provider" database record, which is accessible via APIs, such as those employed by Hardware Provider Adapters 104b in Cluster Service 104. This record typically includes an identification of the provisioned simulation task (i.e., "Cluster ID" or, as noted above, separate "Virtual Server" IDs), along with associated metrics, including timestamps of various activities performed by or with respect to the simulation task (which vary among different hardware providers). This ID typically indicates which specific processes are running on the cluster (or on a distinct virtual or bare metal server). When the execution of a simulation task ceases in its entirety (whether due to the normal completion of the simulation or due to a hardware or software failure), the record is no longer designated as "active" in the hardware provider's database.

Simulation Server Platform 101 maintains a similar corresponding database record in Server DB 105. As will become apparent from the discussion below regarding flowchart 300, Hardware Metering Module 114 relies on information maintained by the Hardware Provider Platforms 130 to perform its metering function and maintain the simulation task record in Server DB 105. It should also be noted (as alluded to above), that the simulation task ID maintained in Server DB 105 may be associated with multiple different bare metal or virtual servers across one or more Hardware Provider Platforms 130.

Returning to flowchart 300, the simulation task ID in the database record in Server DB 105 (retrieved in step 310) identifies the relevant hardware provider associated with the simulation task (whether at the level of granularity of the cluster of servers, or individual bare metal or virtual servers). Hardware Metering Module 114 utilizes this information in step 312 to query the APIs of the relevant hardware provider (via Hardware Provider Adapters 104b) for a matching active "hardware provider" record associated with that simulation task.

In step 315, if the response to the query indicates the existence of such an active hardware provider record, Hardware Metering Module 114 updates, in step 320, the simulation task database record (from Server DB 105) with a START timestamp extracted from that hardware provider record. It should be noted that some amount of time elapses from the time a hardware provider receives a request to provision a cluster and the actual provisioning of that cluster and creation of a "hardware provider" record. In this embodiment, the existence of the hardware provider record indicates the presence of an accurate START timestamp—as this is the timestamp the hardwire provider uses to bill its "customer"—i.e., the Simulation Server Platform 101—once an END timestamp is determined (as discussed below).

Then, in step 322, Hardware Metering Module 114 updates the simulation task database record with a temporary END timestamp based on the current time. In other words, because the simulation task is still "active" from the perspective of the hardware provider, it has not yet ended. But, as will be discussed below, this temporary END timestamp may serve as useful data from which an actual END timestamp may be inferred (e.g., in the event of an abnormal termination of the simulation task due to a hardware or software failure).

Then, in step 330, Hardware Metering Module 114 saves this updated simulation task database record to Server DB 105, and calculates, in step 370, a temporary "current" hardware fee—i.e., the usage time, based on the START and temporary END timestamps, multiplied by the hardware provider's pricing for the provisioned hardware resources. Eventually, the simulation task will be terminated (normally or abnormally), and an active hardware provider record will no longer be found by the query in step 312.

Thus, in step 315, if the response to the query in step 312 indicates that no such active hardware provider record exists (regardless of whether such a record was ever found), hardware provider does not have an active record relating to the simulation task (in step 315), then Hardware Metering Module 114 searches for a START timestamp in Server DB 105 in step 325. If no START timestamp is found (i.e., indicating that the simulation either completed very quickly or, more likely, failed abnormally), then Hardware Metering Module 114, in step 338, uses its "internal" START timestamp as a fallback to update its database record. In other words, it uses the time at which Cluster Service 104 requested provisioning of the cluster (since no START timestamp was available from the hardware provider).

Regardless of the outcome of step 325, Hardware Metering Module 114 now has an updated database record with a START timestamp, and knows that the simulation has ended, but does not yet have an END timestamp. So, in step 340, Hardware Metering Module 114 queries the APIs of the relevant hardware provider (again via Hardware Provider Adapters 104b) for historical metrics regarding the simulation task. In other words, while no active hardware provider record is present, historical metrics are still maintained by the hardware provider.

These metrics are utilized, in step 342, to infer an END timestamp. For example, they may provide a timestamp at which the simulation task was terminated abnormally due to a hardware or software failure. Alternatively, they may indicate a normal termination and provide an actual END timestamp. In other cases, they may not provide an actual END timestamp, but may provide evidence of activity from which an END timestamp can be inferred.

Simulation Server 101 may also detect evidence of normal or abnormal termination of the simulation task via its own monitoring processes (as explained in greater detail below). In one embodiment, if no actual END time can be extracted from this available "evidence," then the timestamp of the latest activity is utilized as an inferred END time. In another embodiment, periodic polling is employed (for a "heartbeat" of activity, or for specific hardware metrics, such as CPU usage) to determine when a simulation task has ended (i.e., when it no longer responds to polling events).

In any event, Hardware Metering Module 114 now has an updated simulation task database record with both START and END timestamps and, in step 360, saves this updated record to Server DB 105. It then proceeds to step 370 and calculates the hardware fee as described above (updating any temporary hardware fee previously calculated). Though not shown in flowchart 300, the result of this "final" hardware fee calculation is utilized for billing purposes (in one embodiment, by combining it with similar fees calculated for other bare metal or virtual servers, perhaps across multiple hardware providers, associated with the same simulation task). In one embodiment, hardware fees across multiple simulation tasks (as well as multiples users within an organization) are then combined to generate monthly hardware fees for an organization and each of its individual users.

In step 375, Hardware Metering Module 114 continually (or, in another embodiment, periodically) searches Server DB 105 for other active simulation tasks to monitor. Once another active simulation task is found, Hardware Metering Module 114 returns to step 310 to retrieve its associated active simulation task database record, and repeat this continuous hardware metering process.

Figure 4:
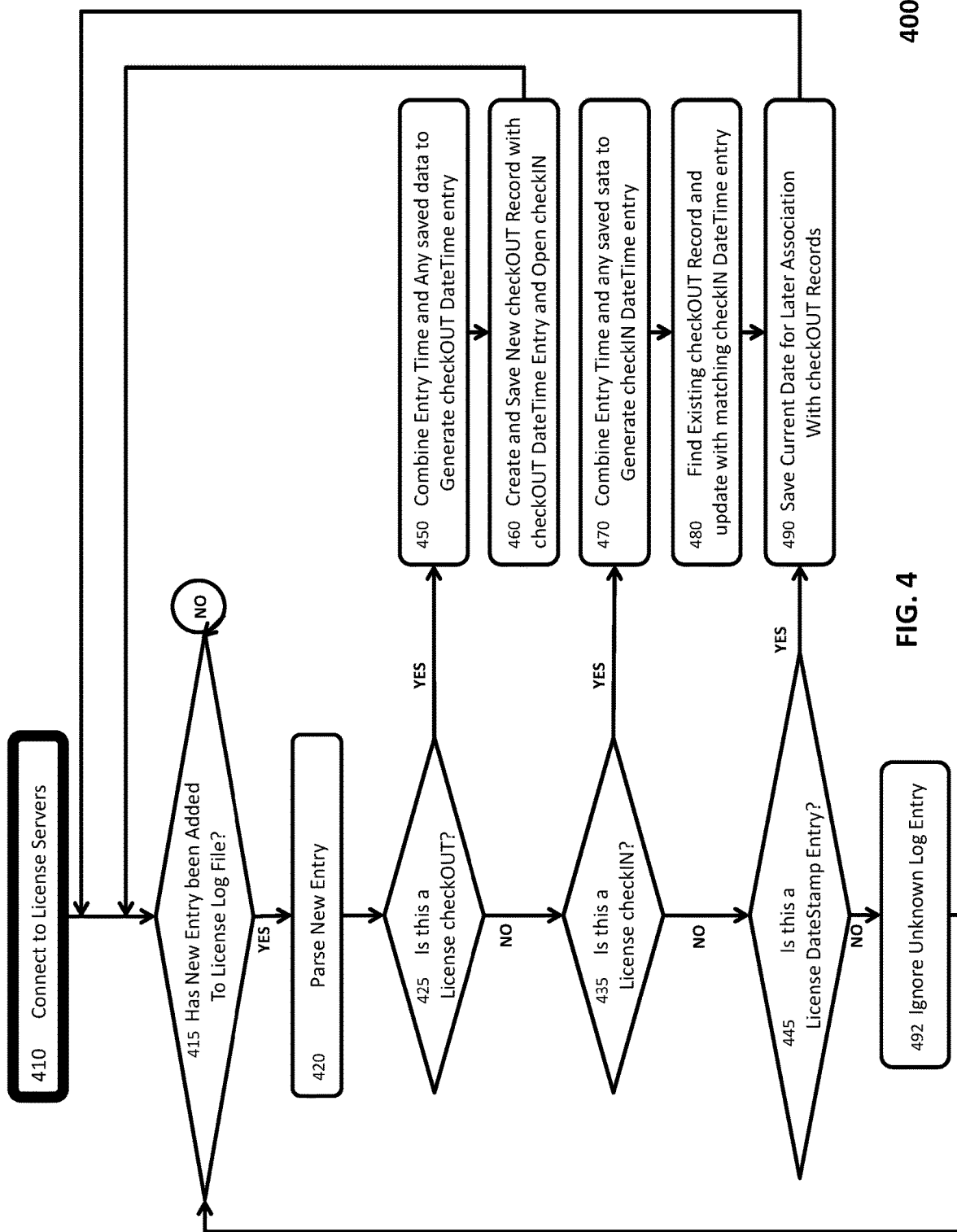
FIG. 4 is a flowchart illustrating one embodiment of a process performed by the software metering module on the simulation server platform of the present invention.

Turning to FIG. 4, flowchart 400 illustrates one embodiment of a metering process performed by Software Metering Module 113 to monitor the time during which the software resources of a provisioned cluster associated with a user's simulation task are in use. In contrast to the hardware metering process described above with respect to FIG. 3 (which monitors START and END times regarding usage of hardware resources), flowchart 400 monitors "checkOUT" and "checkIN" events regarding usage of software resources—i.e., simulation applications (and, in one embodiment, particular component features thereof).

In other words, software metering begins not when the hardware resources of the cluster are provisioned, and not even necessarily when the simulation task is initiated, but when the user of a particular simulation application (or a particular component feature of that application) is authenticated and the application or component feature is launched. This checkOUT event marks the beginning of the software metering process, while a subsequent checkIN event marks the end of the process with respect to usage of a particular simulation application or component feature.

As discussed above, simulation applications employ License Servers 112 to authenticate users before allowing them access. When a user seeks to access a simulation application or component feature—e.g., to initiate a simulation task, or an intermediate part of that task—the simulation application communicates with its associated License Server 112, which authenticates the user and either permits or denies such access. Following authentication, when the simulation application or feature is launched, the License Server 112 generates a checkOUT event, followed eventually by a checkIN event when the simulation application or feature is no longer in use.

License Servers 112 document these checkOUT and checkIN events in "License Log Files" in order to maintain a record of the events for contractual, billing or other purposes. These logged events typically include information identifying the simulation application and the user, as well as a "timestamp" indicating when the event occurred. In some cases, the timestamp identifies both the date and time of the event, while in other cases only the time is included, and a separate "DateStamp" event is generated (e.g., at the beginning or end of each calendar day) from which the date of prior and subsequent timestamps can be inferred.

Software Metering Module 113 includes License Service 113*a* to manage communications with the License Servers 112 so that it can monitor usage of simulation applications by extracting checkOUT and checkIN timestamps from the License Log Files. Beginning with step 410, License Service 113*a* of Software Metering Module 113 establishes a connection with each of the various License Servers 112 responsible for authenticating users of the simulation applications installed by Simulation Platform 101.

In one embodiment, in step 410, Software Metering Module 113 periodically polls the License Servers 112 for new entries. In this embodiment, Software Metering Module 113 gains access to the License Log Files (via the connections established by License Service 113*a*), but must determine, in step 415, whether a new entry has in fact been added since it last checked (e.g., a new line at the end of a License Log File). In another embodiment, an interrupt mechanism is employed to detect a new entry and notify Software Metering Module 113, though such a mechanism requires more extensive integration with the various License Servers 112 (in some cases provided by various Hardware Provider Platforms 130).

In one embodiment, step 415 is a continuous process performed by Software Metering Module 113 that is repeated across the License Log Files generated by all connected License Servers 112 until a new entry is detected. Once Software Metering Module 113 detects a new entry in one of the License Log Files, it processes that entry in the remaining steps of flowchart 400 (beginning with step 420), after which it resumes searching for new entries in step 415.

In a separate process (not shown in flowchart 400), Software Metering Module 113 analyzes each checkOUT record (including a "matching pair" of corresponding checkOUT and checkIN events associated with a particular user's simulation task or component feature) to determine the usage time associated with that record (i.e., the difference between the checkOUT and checkIN event times). It then cumulates these usage times (across simulation tasks, users, organizations of users, and simulation applications) and applies the relevant associated pricing structures to calculate software metering fees for billing purposes. As a result, Simulation Server Platform 101 can generate periodic (e.g., monthly) fee and usage reports (for users, organizations and licensors of simulation applications) detailing the usage of software resources by users of Simulation Server Platform 101.

In one embodiment (also not shown in flowchart 400), if no matching checkIN event is generated and recorded in the License Log Files (e.g., if a simulation application terminated abnormally unknown to its License Server 112), then Software Metered Module 113 creates an artificial checkIN event and infers its date and time from other monitored information. Such information can include a notification from the Hardware Provider Platform 130 on which the cluster is being executed, as well as information discerned from within the cluster itself, as discussed in greater detail below with reference to FIG. 5.

Returning to flowchart 400, once Software Metering Module 113 detects a new entry in one of the License Log Files in step 415, it parses that new entry in step 420 so that it can determine its type. It determines, in step 425, whether the new entry is a checkOUT event. If not, it then determines, in step 435, whether the new entry is a checkIN event. If not, it then determines, in step 445, whether the new entry is a DateStamp entry. If not, it then concludes, in step 492, that the new entry is therefore an "Unknown Log Entry" which it can ignore (and then resume searching for new entries in step 415). In other embodiments, License Servers 112 may generate additional types of events, which can be processed in a similar manner without departing from the spirit of the present invention.

If the new entry is determined in step 425 to be a checkOUT event, Software Metering Module 113 then generates, in step 450, a checkOUT "DateTime" entry, and then creates, in step 460, a new checkOUT record that includes the checkOUT DateTime entry and an "open" checkIN entry (as the simulation application or component feature has yet to be "checked back in"). It then saves this new checkOUT record in Server DB 105. In other words, Software Metering Module 113 saves the date and time of the checkOUT event, as well as related information associating the event with the corresponding simulation application and user's simulation task. As noted above, if the date is not included, Software Metering Module 113 can infer the date from the most recent prior DateStamp entry in the License Log File.

As will be discussed below, this information is subsequently employed by Software Metering Module 113 to match this event with its future corresponding checkIN event to determine overall usage by the relevant simulation task, from which it then calculates software metering fees as noted above. At this point, however, having completed the processing of this checkOUT event, Software Metering Module 113 returns to step 415 to resume searching the License Log Files for new entries.

On the other hand, if the new entry is determined in step 435 to be a checkIN event, Software Metering Module 113 then generates, in step 470, a checkIN "DateTime" entry. Because it knows that there must exist a previous corresponding checkOUT entry, it then searches Server DB 105, in step 480, for the corresponding checkOUT record created and saved back in step 460 (utilizing the related information discussed above associating the checkOUT event with the corresponding simulation application and user's simulation task). Software Metering Module 113 then updates this checkOUT record with the checkIN DateTime entry, and saves the updated checkOUT record in Server DB 105. As was the case with checkOUT events, Software Metering Module 113 can infer the date of this checkIN event (if it is not included in the new entry) from the most recent prior DateStamp entry in the License Log File.

Software Metering Module 113 then, in step 490, saves the current date to Server DB 105 to facilitate the matching of checkIN and checkOUT records due to the fact (noted above) that certain License Servers 112 include only the time (but not the date) with each checkIN and checkOUT entry they add to their License Log File. If the new entry is determined in step 445 to be a DateStamp entry, then Software Metering Module 113, in step 490, saves the current date from that DateStamp entry into Server DB 105. In either case, this "current date" information facilitates the search, in step 480, for a corresponding matching checkOUT record—i.e., ensuring that a date is associated with each checkOUT entry. Software Metering Module 113 then returns to step 415 to resume searching the License Log Files for new entries.

As noted above, this software metering process illustrated in flowchart 400 matches checkOUT and checkIN events for a simulation application generally, as well as for individual component features of that simulation application, thereby accommodating different authentication and pricing mechanisms employed on a feature-by-feature basis by the owner of simulation applications.

Figure 5:
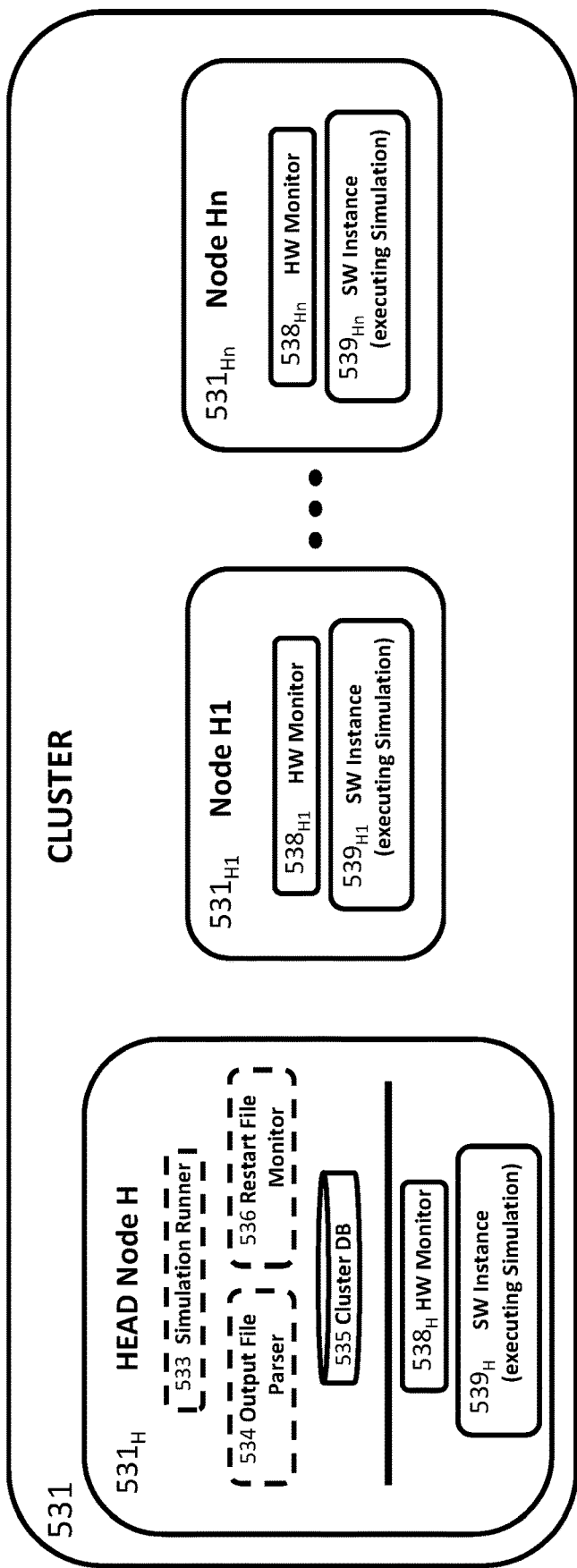
FIG. 5 is an architectural block diagram illustrating one embodiment of the key components of a cluster provisioned on a hardware provider platform by the simulation server platform of the present invention.

Turning to FIG. 5, block diagram 500 illustrates one embodiment of key components of a cluster after it is provisioned on a Hardware Provider Platform 130 by Cluster Service 104. As noted above, Simulation Service 103 configures the cluster by installing and configuring certain components, including instances of the simulation application. It should be noted that these components, despite residing in each cluster associated with a user's simulation task, are conceptually part of the functionality of Simulation Server Platform 101. The allocation of this functionality among different hardware and software components is the result of engineering and design tradeoffs, which can be modified without departing from the spirit of the present invention.

To better understand how Simulation Resource Manager 110 manages the process of monitoring the use of computing resources and modifying them when warranted (as described in greater detail with reference to FIGS. 6 and 7 below), it is helpful to understand how these key functional components interact with a running simulation and facilitate communication between each cluster 531 and the Simulation Server Platform 101.

In one embodiment, for each simulation task, Cluster Service 104 provisions and configures a cluster 531 containing a single "Head Node H" 531$_H$, (which includes an instance 539$_H$ of the simulation application), along with an additional node for each remaining instance of the simulation application (node H1 531$_{H1}$, node H2 531$_{H2}$, . . . node Hn 531$_{Hn}$). In this embodiment, each instance (539$_H$, 539$_{H1}$ . . . 539$_{Hn}$) of the simulation application, installed by Cluster Service 104, is executed by a distinct CPU core. The CPU cores may reside on one or more CPUs in a single physical or virtual server, or be spread across multiple CPUs, physical and virtual servers. In another embodiment, each node corresponds to a virtual server provisioned from a Hardware Provider Platform 130, and can thus contain more than one CPU core and therefore execute more than one instance of the simulation application.

Each node (including Head Node H 531$_H$) also includes a Hardware Monitor (538$_H$, 538$_{H1}$ . . . 538$_{Hn}$), which, as will be explained below, dynamically monitors the use of computing resources by its corresponding instance of the simulation application. Head Node H 531$_H$ also includes additional components (in one embodiment, Simulation Runner 533, Output File Parser 534, Restart File Monitor 536 and Cluster DB 535) relating to management of the simulation task as a whole. The functionality of such components is effectively shared among all of the nodes in cluster 531.

As noted above (and described in greater detail below with reference to FIGS. 6 and 7), Simulation Resource Manager 110 continually monitors execution of each user's simulation task while it is running on its provisioned cluster, searching for various resource change indicators, including computing resource utilization information as well as application-specific information relating to the user's simulation task. In one embodiment, Hardware Monitors (538$_H$, 538$_{H1}$ . . . 538$_{Hn}$) in each node are responsible for obtaining computing resource utilization information, such as the percentage CPU utilization by each CPU core in cluster 531.

While certain computing resource utilization information can be obtained via standard services provided by Hardware Platform Providers 130, Hardware Monitors (538$_H$, 538$_{H1}$ . . . 538$_{Hn}$) also supplement this information, in one embodiment, with additional information not available from the Hardware Platform Provider 130 on which cluster 531 resides, such as the amount of free RAM, overall network bandwidth utilization, etc. The computing resource utilization information obtained by Hardware Monitors (538$_H$, 538$_{H1}$ . . . 538$_{Hn}$), including information obtained indirectly via services provided by Hardware Platform Providers 130, is stored and maintained in Cluster DB 535, and ultimately utilized by Simulation Resource Manager 110 (as described in greater detail below with reference to FIGS. 6 and 7). In one embodiment, data stored in Cluster DB 535 is periodically synchronized with Server DB 105 for use in the event of a hardware or software failure in cluster 531 that prevents further access to Cluster DB 535.

As noted above, Simulation Runner 533 manages the overall operation of the user's simulation task and, in one embodiment, communicates with Simulation Server Platform 101 via Simulation Service 103. In addition to initiating execution of each of the instances ($539_H$, $539_{H1}$ ... $539_{Hn}$) of the simulation application and shutting down the cluster when the simulation has completed (or terminated abnormally), Simulation Runner 533 also manages the dynamic process of obtaining the various resource change indicators—e.g., communicating with Hardware Monitors ($538_H$, $538_{H1}$ ... $538_{Hn}$) to manage the process of obtaining computing resource utilization information.

Simulation Runner 533 also manages the extraction of application-specific information relating to the user's simulation task as a whole (i.e., across multiple instance of the simulation application). As noted above, simulation applications generate and write various types of status information to output files. in the embodiment illustrated in FIG. 5, the simulation application is configured to write these output files to Cluster DB 535 in Head Node H $531_H$. Output File Parser 534 parses these output files to extract information from which Simulation Resource Manager 110 can infer whether a change in computing resources is warranted (e.g., information relating to the efficiency of the simulation application's use of computing resources, including indicators of its potential future computing resource requirements), as explained in greater detail below with respect to FIGS. 6 and 7.

Simulation applications also (as noted above) occasionally generate and write restart files which, in this embodiment, are also written to Cluster DB 535. Restart files include a current intermediate simulation state from the simulation application can be restarted. As noted above, simulation applications typically require pre-configuration information indicating the number of CPU cores on which they will be executed (i.e., one instance per CPU core). For example, 8 instances of a simulation application may initially be running on 8 CPU cores. However, when restarted from the intermediate simulation state identified in a restart file, the simulation application can be configured for a lesser or greater number of CPU cores.

In one embodiment, Restart File Monitor 536 monitors and analyzes the restart files occasionally written by the simulation application, and provides information utilized by Simulation Resource Manager 110 in its determination of whether a change in computing resources is warranted. Such information may include the captured "snapshot" state of particular variables, as well as more general information, such as the time at which the restart file was written. For example, while other resource change indicators might otherwise suggest that a change in computing resources is warranted, the lack of a sufficiently recent restart file may tip the balance against such a determination.

Figure 6:
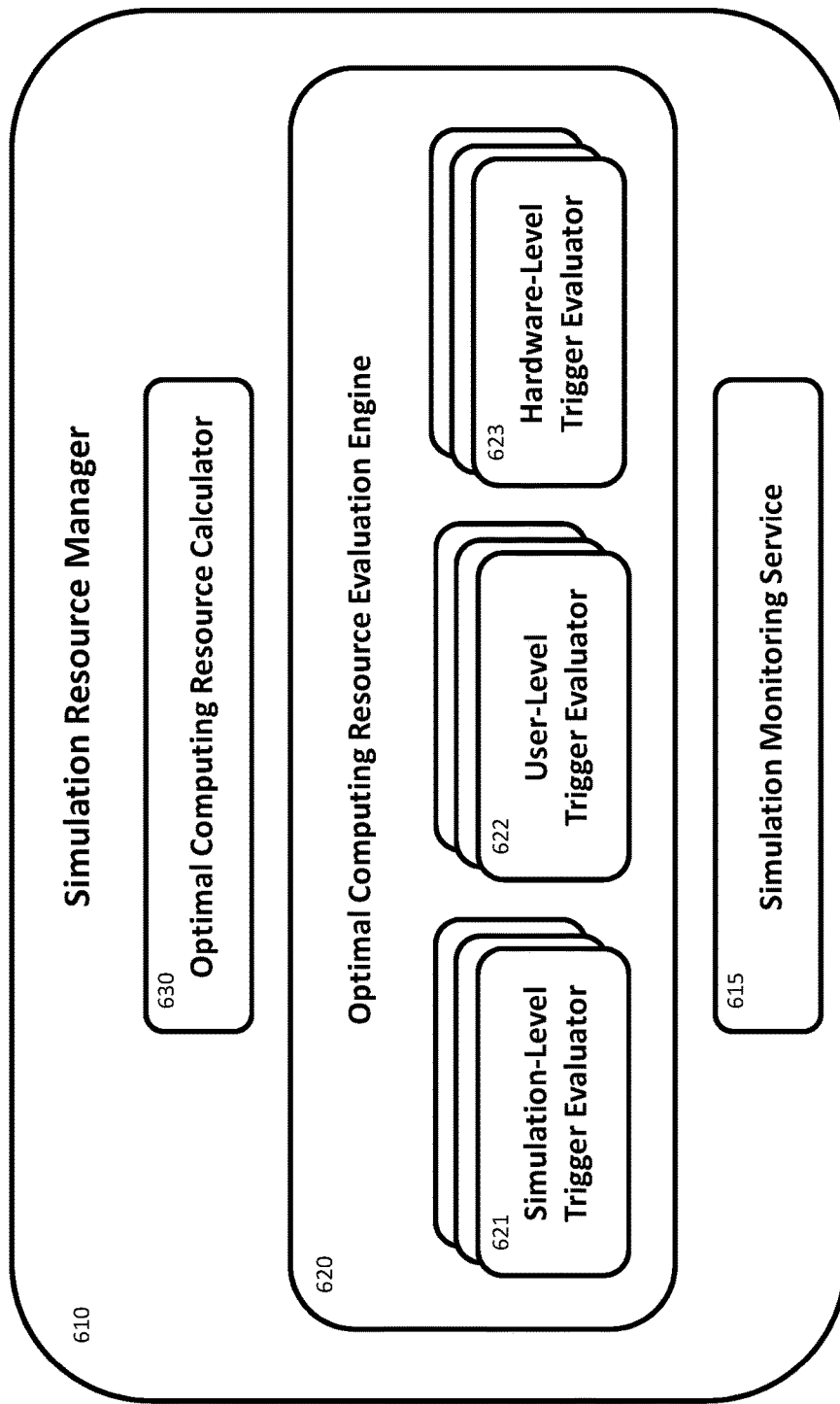
FIG. 6 is an architectural block diagram illustrating one embodiment of the key components of a simulation resource manager on the simulation server platform of the present invention.

Turning to FIG. 6, block diagram 600 illustrates one embodiment of key components of Simulation Resource Manager 110, which determines dynamically, while a user's simulation task is running, whether, when and to what extent to modify the computing resources currently provisioned to the simulation task. Simulation Monitoring Service 615 manages communication with Simulation Runner 533 in each cluster 531 associated with a currently running simulation task.

As noted above, information obtained by Simulation Monitoring Service 615 from Simulation Runner 533 includes resource change indicators, including computing resource utilization information, which relates to percentage utilization of CPU cores, available memory and disk space on each physical or virtual server, disk read/write information (e.g., number of bytes read to and written from particular storage devices within a given period of time), and network bandwidth utilization (e.g., number of bytes transferred across virtual servers). Historical computing resource utilization information is also maintained in Cluster DB 535 over time while the simulation task is running, enabling inferences by Simulation Resource Manager 610 regarding the efficiency of such use.

Simulation Monitoring Service 615 also obtains (from Simulation Runner 533) application-specific information (another type of resource change indicator) relating to the user's simulation task. As noted above, such information is extracted from output files generated by the simulation application, and includes, for example, direct and indirect references to the current number of cells the simulation application is processing with respect to the user's simulation model.

For example, as the simulation progresses, the simulation application may combine or divide the number of cells in some or all parts of the model, enabling Simulation Monitoring Service 615 to infer the current number of cells being processed and, in other embodiments, to predict the number of cells that will be processed in the future. In other cases, the number of cells can be estimated from cell characteristics, such as their length (e.g., 2 mm) or volume (e.g., 1 meter cubed). Given a predefined target number of cells per core, Simulation Monitoring Service 615 infers a new target number of CPU cores, which may affect targets for other computing resources (e.g., a relatively high number of 512 CPU cores may benefit from a higher network bandwidth, such as 10 G Ethernet or, if available, possibly 40 G InfiniBand).

As noted above, cells of a user's simulation data model have various properties (e.g., length, volume, density, temperature, pressure, etc.) that undergo changes over time depending upon the system being modeled and the functionality being performed by the simulation application on the user's simulation data model. For example, in a "computational fluid dynamics" (CFD) simulation, the simulation application may perform calculations on the user's model of an airplane wing to simulate the effects of turbulence on the wing as it moves through the air upon takeoff (or during flight at a given altitude, or during descent for landing, etc.). In this example, the cells of the airplane wing may have certain initial properties, such as volume, temperature, pressure, etc. But, as the wing moves through the air, and encounters air molecules (also represented as cells with analogous properties), the properties of certain cells on the wing may change, for example, based upon standard turbulence and related equations. As a result of these calculations, for example, pressure may increase on certain cells of the wing, which may result in changes to the properties of these and other neighboring cells, and so on as the simulation progresses.

Over the course of numerous iterations of these calculations over time, changes in cell properties perpetuate, and are reflected in status information occasionally written to output files. It should also be noted that different simulation applications write different types of information to output files. For example, some correlate cells to CPU cores, and write data to output files as the number of cells increase or decrease by a predetermined amount or percentage. Others determine a required amount of RAM based upon specifications of the user's simulation data model, and write to output files the minimum and most efficient amounts of RAM required at various times while the simulation is running. Still others require inferences regarding RAM requirements based upon information written to output files indicating the amount and frequency of data written to disk.

Simulation Monitoring Service 615 monitors these different types of application-specific information (obtained from Simulation Runner 533 after being extracted from output files), makes inferences regarding the use of computing resources by the simulation application (e.g., relating to the current number of cells, amount of free RAM, etc.) and organizes and formats this data for evaluation by Optimal Computing Resource Evaluation Engine 620. Simulation Monitoring Service 615 also obtains from Simulation Runner 533 the restart files generated over time by the simulation application, which it provides to Optimal Computing Resource Evaluation Engine 620 to facilitate its analysis in particular of when a change in computing resources is warranted.

In one embodiment, Optimal Computing Resource Evaluation Engine 620 includes a set of "trigger evaluators" to assess this data from Simulation Monitoring Service 615 and determine whether a change in computing resources is warranted. Hardware-Level Trigger Evaluator 623 is employed to assess computing resource utilization data—i.e., current and historical percentages of utilization of each computing resource (CPU, RAM, storage, network bandwidth, etc.).

Simulation-Level Trigger Evaluator 621 is employed to assess application-specific data relating to the user's simulation task (extracted, for example, by Simulation Runner 533 from the output files generated by the simulation application). In one embodiment, individual triggers are employed for each computing resource. Information relating to the number of cells may trigger an increase or decrease in the number of CPU cores. Information evidencing an increase in "inter-core" communication over time may trigger a decrease in the number of CPU cores, and perhaps an increase in the amount of RAM.

Application-specific information may also evidence a transition to a more or less CPU-intensive phase of the simulation, thereby triggering an increase or decrease in the number of CPU cores. For example, a transition to a particular type of component of the simulation application (e.g., a "solver" for a specific type of calculation) frequently indicates a less CPU-intensive "phase" of the simulation. Moreover, evidence that a simulation has completed one of a series or hierarchy of repeating "iteration steps" (e.g., iterations simulating a period of time, mathematical convergence toward a particular solution, such as cell pressure converging toward equilibrium, or other similar repeated iterations) may indicate that the historical utilization of computing resources is likely to be repeated for subsequent "iteration steps." In such a scenario, the historical evidence of the use of the currently provisioned computing resources during one or more iteration steps provides facilitates an inference regarding such use during future iteration steps, and thus (in one embodiment) takes on greater weight regarding the decision of whether a change in computing resources is warranted.

In one embodiment, the triggers of Simulation-Level Trigger Evaluator 621 and Hardware-Level Trigger Evaluator 623 are combined, enabling more complex functions or rules. For example, a triggered increase in CPU cores might require both a threshold increase in the number of cells and in CPU utilization.

Finally, User-Level Trigger Evaluator 622 is employed in one embodiment to facilitate the decision by Optimal Computing Resource Evaluation Engine 620 in light of a user's predefined overall goals (optional in one embodiment) regarding the allocation of computing resources. For example, one user may elect to optimize for minimal cost, while another user may elect to optimize for minimal overall simulation time. In another embodiment, users may provide triggers including functions with predefined thresholds, as well as rules or other heuristics to be utilized by a rules-based implementation of Optimal Computing Resource Evaluation Engine 620.

In one embodiment, Optimal Computing Resource Evaluation Engine 620 employs a learning engine (distributed among its component trigger evaluators) that includes predictive models of the behavior of the simulation application on a given set of provisioned computing resources. For example, one such predictive model predicts the number of cells that will exist in the user's simulation data model over time during the course of the simulation (based upon application-specific data extracted from output files). This predictive model is continuously refined as the simulation progresses and new information is obtained by Simulation Monitoring Service 615. Once the predicted number of cells exceeds a predefined threshold, Simulation-Level Trigger Evaluator 621 "triggers" a recommendation for an increase in the current number of CPU cores.

Other triggers are generated, for example, by Hardware-Level Trigger Evaluator 623, for example, when the percentage utilization of CPU cores (or RAM, storage, network bandwidth or other computing resources) exceeds predefined thresholds. These triggers are combined, in one embodiment, to generate a single decision as to whether a change in one or more computing resources is warranted. For example, in one embodiment, a predefined function is employed to combine the various triggers, and to apply predefined weights to each trigger. In this embodiment, User-Level Trigger Evaluator 622 is employed to modify the weighting of the triggers in these functions by taking into account predetermined user goals. For example, a user goal of optimizing for minimal overall simulation time may weight a trigger for increased CPU cores more heavily (despite the additional resulting cost) than a user goal of optimizing for overall cost.

In other embodiments, instead of a learning engine, Optimal Computing Resource Evaluation Engine 620 includes predefined rules (e.g., as employed by a knowledge-based expert system) that do not predict the future use of computing resources by the simulation task, but instead generate triggers based solely on current data monitored by Simulation Monitoring Service 615 and historical trends monitored over time. For example, one such rule or heuristic employed in this embodiment triggers an increase in CPU cores when the percentage of CPU utilization exceeds a predefined threshold and the number of cells has increased by another predefined threshold percentage over yet another threshold period of time. In yet another embodiment, a simpler set of predefined functions is employed without any knowledge base or expert system.

Optimal Computing Resource Evaluation Engine 620 determines on a continuous basis whether a change in individual computing resources is warranted, regardless of the form of engine employed. In one embodiment, before reaching such a determination, Optimal Computing Resource Evaluation Engine 620 analyzes the restart files to determine whether a sufficiently recent restart file is available. For example, if the state of certain information in the most recent restart file would lead to a different conclusion than would the current version of such information, Optimal Computing Resource Evaluation Engine 620 determines, in one embodiment, that no change to the provisioned computing resources is warranted. In another embodiment, it adjusts the predefined weighting of one or more triggers, based upon the extent of the differences between the versions of such information.

In the event Optimal Computing Resource Evaluation Engine 620 determines that a change in computing resources is warranted, Optimal Computing Resource Calculator 630 is employed to determine an optimal amount of each computing resource to be allocated to the user's simulation task, and to translate that optimal set of computing resources into actual physical or virtual servers to be provisioned from one or more Hardware Provider Platforms 130. For example, based upon the results provided by the various triggers in Optimal Computing Resource Evaluation Engine 620, Optimal Computing Resource Calculator 630 may determine that an increase in CPU cores is warranted, while the amount of RAM should be decreased. But the precise number of CPU cores and amount of RAM are determined, in one embodiment, by extrapolating from the evaluations performed by the various triggers, taking into account both historical trends and projected future computing resource requirements, as well as the constraints imposed by the simulation state available in most recent restart file.

For example, with respect to CPU cores, the projected number of required CPU cores may be based upon historical trends or a predictive learning engine. In any event, the number of cells may be projected to increase at a certain rate which, taking into account a predefined optimal number of cells per core, would yield a desired number of required CPU cores for the remainder of the simulation task (or at least until another change is warranted based upon actual usage data). This desired number may, for example, be reduced slightly once the past results from the time at which the most recent restart file was generated are taken into account.

In one embodiment, a simple average is employed—e.g., selecting 30 CPU cores if the projected needs range from 14 to 46 cores for the remainder of the simulation (from the intermediate state available in the most recent restart file). In another embodiment, a predefined function may yield a different result—e.g., taking into account a user's desire to optimize for minimal cost or minimal overall simulation time, or some other desired goal.

Similar calculations are performed for other computing resources (RAM, storage, network bandwidth, etc.), each of which is based upon the data extracted and monitored by Simulation Monitoring Service 615 for each specific type of computing resource. In each case, the calculations are based upon a projected utilization of that specific computing resource.

Once a desired set of computing resources is determined (taking into account the most recent available restart file), these amounts are effectively translated into a set of computing resources that can actually be provisioned from one or more Hardware Provider Platforms 130. For example, although the calculations may generate a requirement for 30 CPU cores and 3 GB of RAM per CPU core, the closest matching available physical or virtual server may be 2 virtual servers, each of which has 16 CPU cores and 64 GB of RAM.

Note that the current set of configured computing resources may, for example, include a different type of virtual server (e.g., one with 8 CPU cores and 64 GB of RAM). This does not present a problem in one embodiment of the present invention—because a new cluster is provisioned, potentially even from a new Hardware Provider Platform 130.

Once Optimal Computing Resource Calculator 630 determines the new desired set of computing resources to be provisioned as a new cluster, Simulation Resource Manager 110 orchestrates the process for terminating the current cluster, provisioning and configuring the new cluster, and resuming execution of the user's simulation task (from the intermediate simulation state contained in the most recent restart file) on that new cluster. This process is illustrated in flowchart 700 of FIG. 7 below, and described along with examples of the types of simulation scenarios that benefit from this dynamic modification of provisioned computing resources while a user's simulation task is running.

Figure 7:
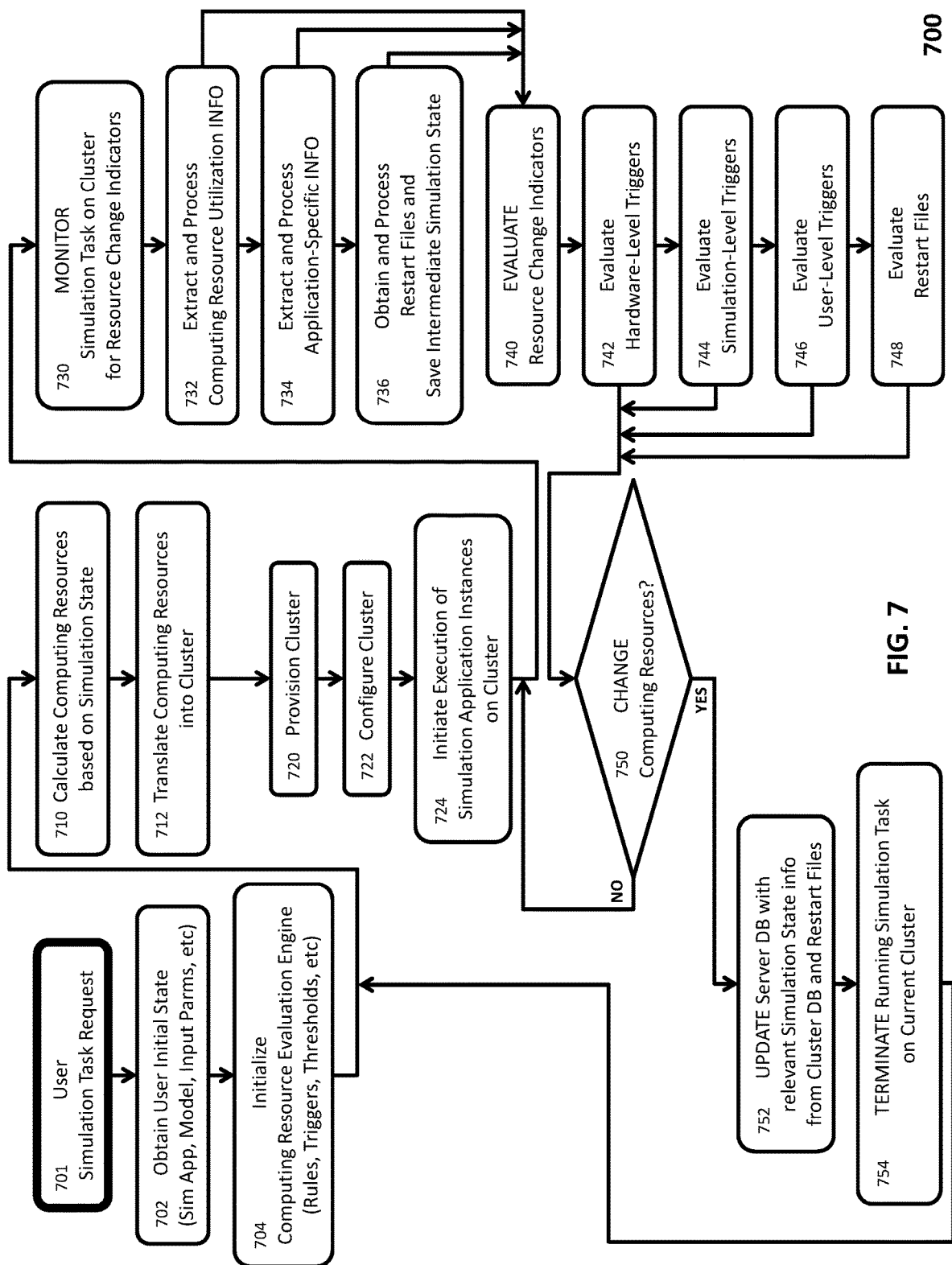
FIG. 7 is a flowchart illustrating one embodiment of the dynamic operation of a simulation resource manager on the simulation server platform of the present invention.

Turning to FIG. 7, flowchart 700 illustrates one embodiment of the dynamic operation of Simulation Resource Manager 110 on Simulation Server Platform 101 of the present invention. This process begins in step 701 (before Simulation Resource Manager 110 is invoked) with receipt by Simulation Server Platform 101 of a user's simulation task request. As noted above, Cluster Service 104 is invoked in step 702 to obtain user information relating to the requested task, including the user's data model, identification of the simulation application and relevant user input parameters.

In step 704, Simulation Resource Manager 110 is invoked to initialize Optimal Computing Resource Evaluation Engine 620. All formulas, thresholds, rules, and other triggers are initialized with predetermined values for subsequent use while the user's simulation task is running—i.e., monitoring the use by the simulation task of the currently provisioned set of computing resources, and evaluating whether, when and to what extent to modify that set of provisioned computing resources.

In one embodiment, this information is predetermined generically for all simulation tasks, while in other embodiments it is tailored to particular types of simulations and simulation applications—taking into account, for example, that different simulation applications perform better with different optimal cell-per-core ratios. In other embodiments, this information is based upon prior simulation runs or other analytics performed by Simulation Server Platform 101 or the user.

Once Optimal Computing Resource Evaluation Engine 620 is initialized, Optimal Computing Resource Calculator 630 is invoked, in step 710, to calculate an optimal set of computing resources to be provisioned to the user's simulation task. It should be noted that, in one embodiment, step 710 is performed to calculate the initial set of computing resources to be provisioned before the user's simulation task is initiated, as well as subsequent sets of computing resources in the event a change in computing resources is warranted while the user's simulation task is running. In another embodiment, users select the initial set of computing resources from choices provided by Simulation Server Platform 101, and this step 710 is performed only when changes are warranted.

With respect to the initial set of computing resources, Optimal Computing Resource Calculator 630 does not yet have access to any analysis by Optimal Computing Resource Evaluation Engine 620, because the user's simulation task has not yet been initiated. However, it does have access to the user's simulation data model, input parameters to the simulation task and any user-provided optimization goals. Moreover, historical data maintained in Server DB 105 may also be available—e.g., relating to the results of prior simulation runs.

For example, a simulation application may recommend an optimal number of cells per core which may yield an optimal number of CPU cores based upon an initial number of cells in the user's simulation data model. Yet, Optimal Computing Resource Calculator 630 may select a different number of initial CPU cores based on an analysis of historical data from similar runs of the user's simulation task. In one embodiment, a prior "pre-run" of an initial time-step iteration (which will be repeated many times during execution of the simulation task) may also suggest a different number of CPU cores or other computing resources.

In some cases, an initial number of cells is defined explicitly in the user's data model, while in other cases Optimal Computing Resource Calculator 630 infers the number of cells—e.g., from the size of an input file, or from other parameters relating to the geometry and characteristics of the mesh to be generated. For example, given a 10 mm cell size and a domain size of 1 cubic meter, Optimal Computing Resource Calculator 630 will calculate an initial cell count of one million cells, and perhaps infer an initial number of 100 CPU cores if the simulation application can support up to 10,000 cells per core.

Moreover, this initial number of cores may effectively dictate other initial computing resources, such as a particular amount of RAM (e.g., based on a minimum 2 GB RAM/core requirement imposed by the simulation application) or a particular network bandwidth (e.g., 20 G or 40 G Infini-Band) required to accommodate that many CPU cores. As will be discussed below, an optimal set of computing resources may need to be refined in light of available physical or virtual server types.

In one embodiment, Optimal Computing Resource Calculator 630 accommodates different types of simulation applications. For example, while some simulation applications correlate cells to CPU cores, others may specify a minimal or desired amount of RAM based upon the user's simulation data model.

Once a simulation task is running on a provisioned cluster defined by an initial set of computing resources, and Optimal Computing Resource Evaluation Engine 620 determines that a change in computing resources is warranted, Optimal Computing Resource Calculator 630 is again invoked to determine a new optimal set of computing resources in light of the changes that have occurred to the simulation state. In that scenario, additional information is now available.

For example, the number of cells in the user's simulation model may have increased or decreased significantly. In one embodiment, Optimal Computing Resource Evaluation Engine 620 predicts the number of cells (or other computing resources) for the remainder of the simulation task—or at least until the simulation task enters another "phase" warranting yet another change in computing resources. Moreover, as alluded to above, evaluation of other resource change indicators monitored by Simulation Monitoring Service 615 and evaluated by Optimal Computing Resource Evaluation Engine 620 may reflect certain changes in this new simulation state from its initial state before the simulation task was initiated.

For example, application-specific information extracted from output files and evaluated by Simulation-Level Trigger Evaluator 621 may indicate that the simulation task is still in an initial "meshing stage" in which the simulation application is generating a mesh based upon the user's simulation model. Yet, computing resource utilization information may indicate that, while CPU utilization was within an expected range, RAM utilization was significantly higher than expected. As a result, based upon the extent of this higher-than-expected RAM utilization, Optimal Computing Resource Calculator 630 will, in one embodiment, leave the number of CPU cores unchanged, while recalculating the amount of RAM based upon an increased RAM per core requirement.

In another scenario, information from Simulation-Level Trigger Evaluator 621 may indicate that the simulation task has entered a more CPU-intensive phase of the simulation, and that additional CPU cores are required (or conversely that fewer CPU cores are required once that phase is completed). While the calculation "formula" may be the same, the resulting number of CPU cores may be higher or lower (than those provisioned in the current cluster) due to the changes in the simulation state extracted from output files generated while the simulation task is running. In another embodiment, different formulas may be employed for different predetermined simulation phases. In yet another embodiment, Optimal Computing Resource Evaluation Engine 620 may generate such different formulas via an embedded learning engine.

In yet another scenario, information from Simulation-Level Trigger Evaluator 621 may indicate that the simulation task has entered a disk-intensive phase of the simulation (e.g., writing out simulation results to disk upon completion of a CPU-intensive phase), and that fewer CPU cores are required, but additional storage space is needed (and perhaps additional network bandwidth). Various other scenarios requiring different sets of computing resources will be evident to one skilled in the art of parallel processing, including simulation and other HPC computing environments.

Once Optimal Computing Resource Calculator 630 completes step 710 and calculates an optimal set of computing resources to be provisioned to the user's simulation task (whether in its initial simulation state or a subsequent intermediate simulation state), it then refines this set of optimal computing resources, in step 712, by translating them into an available cluster. In other words, it employs Hardware Provider Adapters 104b in Cluster Service 104 to identify currently available clusters of physical or virtual servers on one or more Hardware Provider Platforms 130.

For example, it may not be possible to match precisely the specific allocation of computing resources generated in step 710 (e.g., 200 CPU cores, 3 GB RAM per core and 20 G InfiniBand). Optimal Computing Resource Calculator 630 may find a virtual server type with 64 CPU cores, 256 GB RAM, and 40 G InfiniBand, which closely matches these requirements by allocating three virtual servers of that type. But the additional computing resources would require a tradeoff of some additional cost. Alternatively, six virtual servers, each with 32 CPU cores, 128 GB RAM and 20 GB InfiniBand, may also be available. In one embodiment, Optimal Computing Resource Calculator 630 makes this decision by employing predefined functions with weighted parameters based on how close each actual computing resource is to the available cluster choices. In another embodiment, the user's goals (e.g., optimizing for lower cost as opposed to lower overall simulation time) are taken into account in assigning weights to these parameters. In yet another embodiment, a rules-based engine is employed—e.g., ensuring that each computing resource equals or exceeds the specifications generated in step 710.

Once Optimal Computing Resource Calculator 630 completes step 712 and identifies the cluster of computing resources to be allocated to the user's simulation task (including relevant Hardware Provider Platforms 130 and the number and type of each physical and/or virtual server on those platforms), then Cluster Service 104 is invoked, in step 720, to provision that cluster (as discussed above). Simulation Service 103 is then invoked, in step 722, to configure the cluster (as described above with reference to FIG. 5) and initiate execution of each instance of the simulation application on that cluster.

Note, however, if this cluster is not being provisioned initially before the simulation task has been initiated (i.e., if Simulation Resource Manager 610 determines that a change in computing resources is warranted while the user's simulation task is running), then the current cluster is terminated before execution of the simulation task resumes on a newly provisioned cluster.

In one embodiment, Simulation Resource Manager 610, in step 752, updates Server DB 105 with information necessary to resume execution of the simulation task after a new cluster is generated and provisioned. This information will otherwise be lost once the current cluster is terminated. For example, Simulation Resource Manager 610 saves the most recent restart file(s) as well as other information from Cluster DB 535 that may facilitate the calculation of the computing resources and new cluster (in steps 710 and 712) on which the user's simulation task will resume execution. In one embodiment, the entirety of Cluster DB 535 is saved to Server DB 105 before the current cluster is terminated.

Simulation Resource Manager 610 then invokes Cluster Service 104, in step 752, to terminate or "deprovision" the current cluster. Optimal Computing Resource Calculator 630 is then invoked to perform steps 710 and 712 as discussed above. In another embodiment, steps 710 and 712 are performed before steps 752 and 754 (e.g., in the event that it was determined not to be feasible to generate a new cluster, and that execution of the simulation task should continue on the current cluster). In that scenario, Simulation Monitoring Service 615 is invoked to continue monitoring execution of the user's simulation task in step 730, as discussed below.

Otherwise, after steps 710 and 712 have been performed, Cluster Service 104 is invoked to provision the new cluster, and Simulation Service 103 is invoked to configure that new cluster, largely in the manner discussed above. However, because execution of the user's simulation task will resume from the intermediate simulation state contained in the most recent restart file, some additional work is performed by Simulation Service 103 in step 722. For example, Cluster DB 535 is "initialized" in accordance with the intermediate simulation state. Moreover, the simulation application is configured in accordance with any application-imposed constraints, such as specifying the number of CPU cores in the new cluster or any similar constraints relating to the computing resources provisioned in the new cluster.

Then, in step 724, Simulation Service 103 initiates execution of each instance of the simulation application on each CPU core within each physical or virtual server in the new cluster. However, in this scenario, execution of the simulation task is effectively "resumed" from its intermediate simulation state. In the scenario in which the user's simulation task is initiated for the first time—i.e., from its initial simulation state—then steps 722 and 724 are performed with respect to that initial simulation state.

Once execution of the user's simulation task is initiated (or resumed), Simulation Monitoring Service 615 is invoked, in step 730, to monitor execution of that simulation task. As alluded to above, this step effectively involves monitoring the efficiency with which the simulation application utilizes (and, more importantly, will continue to utilize) the provisioned computing resources while the simulation task is running. In other words, as Simulation Monitoring Service 615 monitors execution of the simulation task and extracts various resource change indicators, Optimal Computing Resource Evaluation Engine 620 evaluates these resource change indicators to determine whether a change in computing resources is warranted—i.e., whether one or more of the provisioned computing resources should be modified as execution of the simulation progresses.

For example, in step 732, Simulation Monitoring Service 615 obtains computing resource utilization information as described above, which it processes for subsequent evaluation by Computing Resource Evaluation Engine 620 to assess whether a change in computing resources is warranted. Though listed sequentially, steps 732, 734 and 736 are, in one embodiment, performed in parallel while the simulation task is running. Thus, in step 734, application-specific information is extracted from output files while, in step 736, intermediate simulation states are obtained and saved from restart files as they are generated by the simulation application.

In essence, Simulation Monitoring Service 615 is monitoring a continuously changing simulation state of the user's simulation task. If simulations or other parallel-processing tasks involved easily predictable simulation stages or phases, with known patterns of usage regarding computing resources, then one could simply allocate in advance the appropriate set of computing resources to each such known simulation phase. Because that is rarely the case, Simulation Monitoring Service 615 extracts resource change indicators from which Computing Resource Evaluation Engine 620 makes inferences regarding future usage patterns.

For example, the output files generated by the simulation application contain information regarding the number of cells being processed by each CPU core over time, as well as the extent of inter-core communication. This information, in conjunction with CPU, RAM and other computing resource utilization trends, provides a window into whether the simulation is entering a more or less CPU-intensive phase, or whether it is simply requiring more or fewer computing resources than originally provisioned. Detection of frequently repeating simulation iteration steps also provides information enabling prediction of future computing usage patterns.

In addition to extracting this information in steps 732, 734 and 736, Simulation Monitoring Service 615 processes this information by organizing it into a form in which it can be utilized by Computing Resource Evaluation Engine 620. For example, in one embodiment, computing resource utilization information extracted in step 732 is formatted in Cluster DB 535 to support time-based queries on individual computing resources, such as the percentage increase in CPU utilization over the past 15 minutes of simulation time. In other embodiments, information is organized to facilitate queries that correlate additional factors or events beyond mere time, such as the current number of cells per core, threshold number of writes to disk or even presence of a restart file. In other words, the organization of information extracted by Simulation Monitoring Service 615 facilitates the evaluation by Computing Resource Evaluation Engine 620 of factors that cut across its component trigger evaluators.

The evaluation of resource change indicators by Computing Resource Evaluation Engine 620 in step 740 also involves, in one embodiment, a set of steps (742, 744, 746 and 748) that are listed sequentially but performed in parallel. For example, a rule or heuristic employed by Hardware-Level Trigger Evaluator 623 may be triggered when CPU utilization exceeds 90%, while another rule may be triggered only if CPU utilization exceeds 90% and information extracted from output files indicates that a current CPU-intensive phase of the simulation has been completed (detected, for example, by Simulation-Level Trigger Evaluator 621). Another rule might be triggered when CPU utilization falls below a specified threshold and disk I/O exceeds a specified threshold, suggesting a need for a physical or virtual server with greater network bandwidth.

In other words, in step 742, Hardware-Level Trigger Evaluator 623 generates trigger conditions or events relating to computing resource utilization, while in step 744, Simulation-Level Trigger Evaluator 621 generates conditions or events relating to application-specific information extracted from output files. As noted above, such application-level events include detection of iteration steps, e.g., simulating repeated real-world events such as a heartbeat, opening or closing of a valve, seconds of a simulated event such as a car crash, or even a hierarchy of iteration steps separately calculating cell pressure, temperature and velocity.

In certain scenarios, subsequent iteration steps involve different types of calculations. For example, in a chemical simulation, initial steps may involve relatively short calculations across a wide domain of objects, such as molecules. Such steps may benefit from relatively high levels of parallelism across many CPU cores. Subsequent calculations, however, may be successively more complex and take a longer time to complete, but across fewer and fewer objects (thus benefitting from relatively less parallelism and fewer CPU cores). Detection of such phases by Simulation-Level Trigger Evaluator 621 facilitates prediction of future CPU usage. In one embodiment, Simulation-Level Trigger Evaluator 621 generates conditions or events that may not only trigger a change in the number of CPU cores, but will, in such a scenario, facilitate the calculation by Optimal Computing Resource Calculator 630 of an optimal number of CPU cores to be provisioned in a new cluster.

Similarly, in step 746, User-Level Trigger Evaluator 622 generates conditions or events in accordance with user-imposed goals. In one embodiment, such goals are implemented by weighting parameters of rules from other trigger evaluators—e.g., causing the threshold of CPU utilization to be raised to 95% before additional CPU cores are added at an additional cost to the user. Conversely, a lower threshold of CPU utilization may be raised from 40% to 45% before CPU cores are decreased, thereby saving the user money). In one embodiment, extreme weighting of certain factors (e.g., a lower threshold of free RAM) is employed to avoid potentially catastrophic events, such as crashing the simulation due to running out of RAM.

In step 748, Simulation-Level Trigger Evaluator 621 creates conditions or events relating to restart files generated by the simulation application. In one embodiment, the presence of a restart file within a threshold period of time triggers such a condition. In other embodiments, conditions may be triggered based upon specific events extracted or inferred from the contents of a restart file, such as invocation of a component solver of the simulation application (e.g., evidencing entry into a more CPU-intensive, but less disk-intensive, phase of the simulation).

As noted above, Computing Resource Evaluation Engine 620 is implemented, in one embodiment, as a learning engine which predicts future usage of computing resources based upon historical information monitored over time, and employs dynamically-generated triggers rather than predefined rules from a knowledge base. In another embodiment, heuristic rules are generated dynamically from a continuously expanding knowledge base, while in yet another embodiment, predefined "static" formulas and thresholds are employed.

The following scenario illustrates the operation of Computing Resource Evaluation Engine 620 (in particular the performance of steps 742, 744, 746 and 748) in making the determination, in step 750, as to whether a change in computing resources is warranted. If such a change is warranted, Simulation Resource Manager 610 is invoked, in step 752, as described above (to update Server DB 105 with information necessary to resume execution of the simulation task after a new cluster is generated and provisioned). Otherwise, Simulation Monitoring Service 615 is invoked to continue monitoring execution of the user's simulation task in step 730.

In one scenario, a user's simulation task involves a combustion model for a CFD (computational fluid dynamics) application—simulating, for example, combustion of an automotive engine. In this scenario, when a combustion event occurs, the simulation enters a CPU-intensive phase in which cell size decreases and the number of cells increase significantly. In other words, the simulation application splits each cell into multiple (e.g., 8) cells. While such simulation applications typically may be configured to limit the number of splits that can occur (or conversely the number of times multiple cells are combined into a single cell), the occurrence of a combustion or similar event cannot easily be predicted in advance.

In this scenario, the simulation application generates output files occasionally that include information relating to the current number of cells in the user's simulation model. As noted above, these output files are generated to enable users to manually detect bugs in the model—i.e., highly unusual situations that warrant shutting down the simulation and running it again from the beginning once the bugs are fixed. However, in the present invention, Simulation-Level Trigger Evaluator 621 detects, in step 744, that a combustion event has begun, based upon information extracted from the output files. For example, such information may indicate a sharp increase in the number of cells, or an explicit "split" event. In some cases, this event may be confirmed by other information in the output file, such as invocation of a particular solver designed to handle the combustion event.

Simulation-Level Trigger Evaluator 621 may also detect, in step 748, that a restart file was generated relatively recently before the simulation entered the combustion phase, ultimately causing Computing Resource Evaluation Engine 620 to increase the number of CPU cores. Other computing resources may be affected as well. For example, Hardware-Level Trigger Evaluator 623 may have triggered one or more conditions, in step 742, resulting from the increased demand on the existing number of CPU cores—e.g., an increase in writes to disk and a significant decrease in available RAM.

But, in this embodiment, Computing Resource Evaluation Engine 620 predicts how a future increase in the number of CPU cores (e.g., from 64 to 128) will affect the utilization of these other computing resources. For example, the current amount of RAM per CPU core may be sufficient once the load of the additional computations is spread across a greater number of CPU cores (easing the load on each physical or virtual server), while the network bandwidth may need to be increased due to an increase in inter-core and inter-server communication.

Thus, as a result, Optimal Computing Resource Calculator 630 is invoked, in step 710, to calculate these changes in computing resources, and a new cluster is provisioned in step 720 and configured in step 722. This new cluster, because it consists of more CPU cores, the same amount of RAM and a greater network bandwidth, may require a different type of physical or virtual server, perhaps on a different Hardware Provider Platform 130 (e.g., due to current availability).

Due to the existence of a relatively recent restart file, the simulation task may resume execution on the new cluster, in step 724, before the beginning of the combustion phase of the simulation (thus avoiding the inefficiency of having too few CPU cores and potentially crashing due to an insufficient amount of RAM). Moreover, upon later detecting the end of this combustion phase in a similar manner, Simulation Resource Manager 610 will modify the computing resources again (e.g., reducing the number of CPU cores, as well as modifying other computing resources accordingly) and provision yet another cluster to resume execution of the simulation task.

Thus, in this combustion scenario, three different clusters are provisioned while the simulation task is running, each based on optimal allocations of computing resources to the simulation task at different points during its execution— determined by monitoring and extracting resource change indicators, predicting future usage patterns and generating new clusters with different sets of computing resources to accommodate these future usage patterns.

In other scenarios, new clusters may be provisioned at multiple different points during the execution of the simulation task. As noted above, it is often difficult to predict in advance when these points will occur (even in our combustion example above when the occurrence of the event is known), as well as how many different times during a simulation a change in computing resources may be warranted. For example, in the case of simulations involving "variable" iteration steps, in which the calculations performed during each step may well differ in time, complexity or other respects (whether randomly, gradually increasing or decreasing, or otherwise), it is virtually impossible to predict in advance when each iteration step will occur, much less which set of computing resources to allocate to each particular step.

However, by monitoring the simulation state while a simulation task is running, and extracting resource change indicators (including computing resource utilization information as well as application-specific information from output files generated by the simulation application), the present invention predicts future computing resource usage patterns (e.g., assessing whether a subsequent iteration step requires an increase or decrease in each individual computing resource) and determines an optimal set of computing resources (translated into clusters of physical and/or virtual servers) to be allocated to the simulation task. Moreover, by leveraging restart files generated by the simulation application, the present invention terminates existing clusters and provisions new clusters (when it determines that a change in computing resources is warranted and feasible), and resumes execution of the simulation task on the newly provisioned cluster. This process can be repeated as many times as is warranted while a simulation task is running.

It should be noted that computing resources cannot feasibly be changed too frequently, as the overhead of terminating and provisioning new clusters may not justify the benefits of a more efficient allocation of computing resources. In one embodiment, this tradeoff is considered as a factor by Simulation Resource Manager 610 (e.g., based upon the time between cluster changes) in determining whether a change in computing resources is in fact warranted.

The embodiments of the systems and methods of the present invention described above provide significant advantages to users of Simulation Server Platform 101. Such users need not rely upon a single set of computing resources to be allocated to the entirety of their simulation task. Moreover, they need not determine themselves whether, when and to what extent a change in computing resources is warranted while their simulation task is running (as is required, for example, by Amazon's EC2 Auto Scaling service). Finally, users retain the benefits of having their simulation applications address application-imposed constraints and inter-core (and inter-server) dependencies that arise during execution of their simulation tasks.

Other advantages include automated hardware and software metering, which enables users to pay only for the computing resources actually used by their simulation tasks, and avoid overpaying for computing resources not required at all times during the execution of their simulation tasks.

The invention claimed is:

1. A method for facilitating hardware and software metering of tasks performed by a plurality of applications on behalf of a plurality of users, the method comprising the following steps:
   (a) provisioning a first cluster of computing resources on one of a plurality of hardware provider platforms for executing an application on behalf of a user and, in the event a change in computing resources is warranted while the application is running, provisioning a second cluster of computing resources and terminating the application on the first cluster;
   (b) configuring the application and initiating execution of the application on the provisioned first cluster and, in the event the second cluster is provisioned by the cluster service, reconfigures the application and resumes execution of the application on the second cluster;
   (c) authenticating each user of the application with a corresponding license server before permitting that user to initiate execution of the application on the provisioned first and second cluster; (d) monitoring the total hardware time the provisioned computing resources are in use during execution of the task, wherein the total hardware time includes the sum of the times the provisioned computing resources are in use on the first cluster and the second cluster; and
   (e) monitoring the total time the application is in use during execution of the task, wherein the total software time includes the sum of the times the application is in use on the first cluster and the second cluster.

2. The method of claim 1, further comprising the step of authenticating each user of a component of the application before permitting that user to initiate execution of the component of the application on the provisioned first and second cluster.

3. The method of claim 1, further comprising the step of monitoring the total software time a component of the application is in use during execution of the task.

4. The system of claim 1, further comprising the step of monitoring a plurality of applications performing the task.

5. The method of claim 1, wherein the application performs a task having inter-instance dependencies, and the application, in order to execute properly and resolve the inter-instance dependencies, includes one or more application-imposed constraints requiring a pre-configuration specification of at least one of the computing resources allocated to the application, the method further comprising the following steps:
   (a) monitoring execution of the application for (i) a plurality of computing resource change indicators and (ii) one or more restart files generated by the application; and
   (b) continuously analyzing the computing resource change indicators and restart files to determine whether modification of the current computing resources is warranted and, if so, implementing a change in the current computing resources while the application is running.

6. The method of claim 5, wherein:
   (a) the cluster includes a plurality of CPU cores for executing independent sub-task calculations of the application in parallel, including a first sub-task calculation performed by a first instance of the application on a first CPU core, and a second sub-task calculation performed by a second instance of the application on a second CPU core; and
   (b) a third sub-task calculation performed by the first instance is dependent upon the results of the second sub-task calculation performed by the second instance, and thereby constitutes an inter-instance dependency.

7. The method of claim 5, wherein the plurality of computing resource change indicators include:
   (a) computing resource utilization data that reflect the extent of the application's current usage of the computing resources; and
   (b) application-specific data, including data extracted from output files generated by the application during its execution, that facilitate a prediction of the application's future usage of computing resources.

8. The method of claim 5, wherein the computing resource change indicators include indicators of one or more of the following: (a) a change in the number of cells in a simulation data model provided as input to the application, (b) one or more repeating iteration steps in the task performed by the application; (c) a change in the extent of inter-core communication exhibited by the application; and (d) a change to a more or less computing resource-intensive phase of the task performed by the application.

9. The method of claim 5, further comprising the step of generating, based on the analysis of the computing resource change indicators, a prediction regarding the extent of the application's future usage of computing resources.

10. The method of claim 5, wherein the determination of whether modification of the current computing resources is warranted is based on historical information monitored over time.

11. The method of claim 5, wherein the application-imposed constraints include a pre-configuration specification of the number of CPU cores in the provisioned first and second cluster.

12. The method of claim 5, wherein the change in computing resources includes an increase in one computing resource and a decrease in another computing resource.

13. The method of claim 5, wherein each restart file contains data reflecting the application's current intermediate state, thereby enabling the application, if restarted in the future, to resume execution from that intermediate state.

14. The method of claim 5, wherein the implementation of a change in the current computing resources while the application is running includes the following steps:
   (a) provisioning the second cluster of computing resources on a selected hardware provider platform;
   (b) terminating the first cluster on which the application is executing;
   (c) reconfiguring the application in accordance with the application-imposed constraints; and
   (d) resuming execution of the application on the second cluster from the intermediate state contained within a selected one of the restart files.

* * * * *